(12) United States Patent
Aoshima et al.

(10) Patent No.: US 8,503,104 B2
(45) Date of Patent: Aug. 6, 2013

(54) MOTOR HAVING SMALL SIZE AND HIGH OUTPUT, AND LIGHT AMOUNT ADJUSTMENT DEVICE EQUIPPED WITH THE MOTOR

(75) Inventors: Chikara Aoshima, Zama (JP); Naoto Mochizuki, Minamikoma-gun (JP)

(73) Assignees: Canon Kabushiki Kaisha (JP); Nisca Corporation (JP)

( * ) Notice: Subject to any disclaimer, the term of this patent is extended or adjusted under 35 U.S.C. 154(b) by 0 days.

(21) Appl. No.: 13/226,550

(22) Filed: Sep. 7, 2011

(65) Prior Publication Data

US 2012/0063005 A1    Mar. 15, 2012

(30) Foreign Application Priority Data

Sep. 10, 2010    (JP) ................................. 2010-203148
Sep. 10, 2010    (JP) ................................. 2010-203149

(51) Int. Cl.
  *G02B 15/14*    (2006.01)
(52) U.S. Cl.
  USPC ........................... 359/699; 359/676; 359/694
(58) Field of Classification Search
  USPC .................. 310/49.19, 112, 156.32, 216.074,
        310/254, 268; 355/71; 359/694, 696, 699
  See application file for complete search history.

(56) References Cited

U.S. PATENT DOCUMENTS 5,926,663 A * 7/1999 Suzuki .......................... 396/449

FOREIGN PATENT DOCUMENTS

| JP | 05-336729 A | 12/1993 |
|---|---|---|
| JP | 2000-032721 A | 1/2000 |
| JP | 2002-369488 A | 12/2002 |
| JP | 2004-064876 A | 2/2004 |
| JP | 2005-143207 A | 6/2005 |
| JP | 2009-180921 A | 8/2009 |

* cited by examiner

*Primary Examiner* — Mahidere Sahle
(74) *Attorney, Agent, or Firm* — Rossi, Kimms & McDowell LLP

(57) ABSTRACT

A light amount adjustment device including a motor which can be reduced in size by reducing radial and axial dimensions and makes it possible to increase the motor output. The device has a stator of a motor drive mechanism formed integrally with a holding member fixed to a cam member with aperture blades and a rotary member for driving them sandwiched therebetween. A stator includes a support portion, and first and second magnetic pole portions. The first and second magnetic pole portions extend toward an outer periphery of the rotor and coils are inserted thereon from respective extending ends. The extending ends are disposed in a manner opposed to the outer periphery of the rotor. The two portions are disposed with an angle therebetween such that respective lines extending in the extending directions intersect with each other.

9 Claims, 14 Drawing Sheets

MOTOR HAVING SMALL SIZE AND HIGH OUTPUT, AND LIGHT AMOUNT ADJUSTMENT DEVICE EQUIPPED WITH THE MOTOR

BACKGROUND OF THE INVENTION

1. Field of the Invention

The present invention relates to a motor such as a stepping motor, which is used as a drive source of a light amount adjustment device provided in e.g. a digital camera, and a light amount adjustment device equipped with the motor.

2. Description of the Related Art

As a conventional drive source of a light amount adjustment device, for example, there has been known a stepping motor shown in FIGS. 14 and 15 (Japanese Patent Laid-Open Publication No. 2005-143207). FIG. 14 is a vertical cross-sectional view schematically showing an example of a conventional stepping motor, and FIG. 15 is a partial cross-sectional view schematically showing a state of magnetic flux flowing from a stator of the stepping motor shown in FIG. 14.

The stepping motor shown in FIG. 14 has two bobbins 101 around each of which a stator coil 105 is concentrically wound, arranged axially side by side, and these two bobbins 101 are fixed to respective stator yokes 106, in a sandwiched manner. Each stator yoke 106 has an inner diameter surface formed with stator teeth 106a and 106b which are alternately arranged along a circumferential direction. The stator yokes 106 having the stator teeth 106a or 106b integrally formed therewith are fixed to two cases 103, respectively. Thus, two stators 102 which are associated with the two stator coils 105 for excitation, respectively, are formed.

One of the two cases 103 has a flange 115 and a bearing 108 fixed thereto, and the other case 103 has a bearing 108 fixed thereto. A rotor 109 has a rotor magnet 111 fixed to a rotor shaft 110, and the rotor magnet 111 defines radial spaces with the respective stator yokes 106 of the two stators 102.

The rotor shaft 110 is rotatably supported by the two bearings 108. Magnetic flux generated by energization of the stator coils 105, as shown in FIG. 15, mainly passes through an end surface 106a1 of the stator tooth 106a and an end surface 106b1 of the stator tooth 106b.

Further, as a conventional drive source of a light amount adjustment device, for example, there has been known a stepping motor shown in FIGS. 16 and (Japanese Patent Laid-Open Publication No. 2004-064876). FIG. 16 is an exploded perspective view of a conventional stepping motor, and FIG. 17 is a cross-sectional view of the stepping motor shown in FIG. 16, which is in an assembled state, taken along the axial direction.

In FIGS. 16 and 17, a rotor 21 includes a hollow cylindrical magnet portion formed by a permanent magnet, and shafts 21t and 21s provided on opposite ends of the magnet portion. The magnet portion is magnetized such that S and N poles alternate with each other in the circumferential direction, and the magnet portion and the shafts 21t and 21s are integrally formed by molding or by adhesion, whereby the rotor 21 has a reduced radial dimension.

The shafts 21t and 21s of the rotor 21 are rotatably fitted in a fitting hole 22h of a stator 22, and a fitting hole 25a of a cover 25, respectively. The stator 22 is formed of a soft magnetic material, and includes not only an inner cylinder 22g forming an inner magnetic pole part, but also first outer magnetic pole parts 22a, 22b, and 22c, and second outer magnetic pole parts 22d, 22e, and 22f, each having a comb-tooth shape, which extend parallel to an axis of the inner cylinder 22g, at locations outward of the inner cylinder 22g.

First and second coils 23 and 24 are wound around the first and second outer magnetic pole parts 22a to 22c, and 22d to 22f, respectively, and magnetic flux generated by supplying current to the coils 23 and 24 for excitation acts on the magnet portion of the rotor 21.

Further, as a drive source of a light amount adjustment device, for example, there has been known a stepping motor shown in FIG. 18 (Japanese Patent Laid-Open Publication No. 2000-032721). FIG. 18 is a cross-sectional view of the conventional stepping motor taken along an axial direction thereof.

Also in the stepping motor shown in FIG. 18, similarly to the stepping motor disclosed in Japanese Patent Laid-Open Publication No. 2004-064876, a coil 38 is vertically provided parallel to a rotary shaft 36 of a rotor 37, and further, a nonmagnetic member 30 is interposed.

Further, as a conventional drive source of a light amount adjustment device, there has been known, for example, a stepping motor shown in FIG. 19 (Japanese Patent Laid-Open Publication No. H05-336729). FIG. 19 is a perspective view showing essential parts of the conventional stepping motor.

In FIG. 19, a rotor 47 is fixed to a lens barrel base plate 41 in a manner rotatable about a rotary shaft 47e, and is magnetized in a manner radially divided into two magnetized portions 47a and 47b. Further, the rotor 47 is axially divided into two magnetized layers 47c and 47d.

A first stator 48 includes magnetic pole parts 48a and 48b, which are fixed to the lens barrel base plate 41 at respective locations adjacent to the rotor 47. A second stator 49 also includes magnetic pole parts 49a and 49b, which are fixed to the lens barrel base plate 41 at respective locations adjacent to the rotor 47, from a side opposite from the first stator 48. Further, coils 45 and 46 for exciting their magnetic pole parts are wound around the stators 48 and 49, respectively.

FIG. 20 is an exploded perspective view of a conventional light amount adjustment device using, as a drive source thereof, one of the stepping motors disclosed in the above-mentioned Japanese Patent Laid-Open Publications No. 2005-143207 to H05-336729 (Japanese Patent Laid-Open Publication No. 2009-180921).

In FIG. 20, aperture blades 51 to 57 are each formed of a synthetic resin, and include thin plate-shaped first base portions 51a to 57a and second base portions 51b to 57b, respectively, which have light shielding properties and adjust the amount of opening of the device. The first base portions 51a to 57a have first shafts 51c to 57c integrally formed on one surfaces thereof, and second shafts 51d to 57d (some of which are not shown) integrally formed on the other surfaces thereof, respectively.

A rotary member 58 is used for driving the aperture blades 51 to 57, and is formed into a ring shape having an opening 58a in a central portion thereof. The rotary member 58 is provided with holes 58b to 58h, a rotary fitting protruding portion 58i, a gear 58j, and a light shielding portion 58k.

A cam member 59 is a ring-shaped member having an opening 59a in a central portion thereof, and the opening 59a defines a maximum amount of aperture opening adjusted by the aperture blades 51 to 57. Further, the cam member 59 is provided with cam groove portions 59b to 59h.

A holding member 60 is a ring-shaped holding member having an opening 60a in a central portion thereof. The holding member 60 is provided with a hole 60b and a motor mounting portion 60c.

A stepping motor 61 is used for driving the rotary member 58, and is mounted to the motor mounting portion 60c of the holding member 60. At this time, a pinion 62 fixed to a motor shaft of the stepping motor 61 extends through the hole 60b of the holding member 60 and meshes with the gear 58*j* of the rotary member 58. The stepping motor 61 is a two-phase PM (permanent magnet) type stepping motor including two coils of a general type.

That is, the pinion 62 fixed to the motor shaft of the stepping motor 61 meshes with the gear 58*j* of the rotary member 58, whereby the rotary member 58 and the stepping motor 61 are gear-connected to each other.

An initial position sensor 63 detects a state in which the light shielding portion 58*k* of the rotary member 58 has moved into or out of the initial position sensor 63 to thereby detect whether or not the rotary member 58 is in the initial position.

The holding member 60 is fixed to the cam member 59 in a manner sandwiching the rotary member 58 and the aperture blades 51 to 57, and functions as a retainer for retaining the rotary member 58 and the aperture blades 51 to 57 in the direction of the optical axis. At this time, the rotary fitting protruding portion 58*i* of the rotary member 58 is fitted in the opening 60*a* of the holding member 60, and is rotatably supported. Further, the first shafts 51*c* to 57*c* of the aperture blades 51 to 57 are pivotally fitted in the holes 58*b* to 58*h* of the rotary member 58, respectively, and the second shafts 51*d* to 57*d* are slidably fitted in the cam groove portions 59*b* to 59*h* of the cam member 59, respectively.

The aperture blades 51 to 57 are arranged at equally-spaced intervals in a circumferential direction about the optical axis, and the first base portions 51*a* to 57*a* and second base portions 51*b* to 57*b* which have light shielding properties are arranged in an overlapping manner whereby it is possible to control the aperture opening such that as the overlapping areas are larger, the amount of aperture opening becomes smaller.

Further, as another conventional light amount adjustment device, there has also been known a light amount adjustment device which uses, as a drive source thereof, a stepping motor which forms a magnetic circuit using a pair of substantially U-shaped yokes which are opposed to each other across a rotor (Japanese Patent Laid-Open Publication No. 2002-369488).

Incidentally, referring to FIG. 21, assuming that the diameter of a motor M is d1 and the diameter of an opening 301 which defines a maximum opening amount of a light amount adjustment device 300 is d2, the light amount adjustment device 300 has a diameter d3 which is equal to at least (2×d1+d2).

However, in the above-described stepping motor disclosed in Japanese Patent Laid-Open Publication No. 2005-143207 (see FIG. 14), the cases 103, the bobbins 101, the stator coils 105, and the stator yokes 106 are concentrically arranged on the outer periphery side of the rotor 109, and hence the motor has large outer dimensions. This increases the diameter d3 of the light amount adjustment device 300, and as a result, the light amount adjustment device 300 is increased in size.

Further, in the above-described stepping motor disclosed in Japanese Patent Laid-Open Publication No. 2005-143207, magnetic flux generated by energization of the stator coils 105 mainly passes the end surface 106*a*1 of the stator tooth 106*a* and the end surface 106*b*1 of the stator tooth 106*b* as shown in FIG. 15. Therefore, the magnetic flux generated by energization of the stator coils 105 does not effectively act on the rotor magnet 111, which makes it difficult to increase the motor output.

The above-described stepping motor disclosed in Japanese Patent Laid-Open Publication No. 2004-064876 (see FIGS. 16 and 17) has the following problem: Since the first and second coils 23 and 24 are vertically arranged parallel to the rotary shaft of the rotor 21, the dimension in the radial direction can be reduced. However, to increase the motor output, the dimension in the direction of height (axial direction) is inevitably increased.

In the above-described stepping motor disclosed in Japanese Patent Laid-Open Publication No. 2000-032721 (see FIG. 18), similarly to the stepping motor disclosed in Japanese Patent Laid-Open Publication No. 2004-064876, since the coil 38 is vertically arranged parallel to the rotary shaft 36 of the rotor 37, and further, the nonmagnetic member 30 is interposed, the dimension in the radial direction can be reduced, but the dimension in the direction of height (axial direction) is increased.

In the above-described stepping motor disclosed in Japanese Patent Laid-Open Publication No. H05-336729 (see FIG. 19), although the dimension in the radial direction can be reduced, it is required to provide an enough height to accommodate the lens barrel base plate 41 for supporting the rotor 47, the first and second stators 48 and 49, and the coils 45 and 46. This increases the dimension in the direction of height of the stepping motor (axial direction). Further, since magnetic flux generated by the stator magnetic poles does not effectively act on the permanent magnet of the rotor 47, it is difficult to increase the motor output.

The above-described stepping motor disclosed in Japanese Patent Laid-Open Publication No. 2002-369488 has a structure in which an exciting coil is fitted on one of two extension portions (magnetic pole arms) of each substantially U-shaped yoke. Therefore, if the number of windings of the exciting coil is increased to increase motor torque, the diameter of the exciting coil is increased, which results in an increase in the dimension of the motor in the radial direction.

SUMMARY OF THE INVENTION

The present invention provides a motor which can be reduced in size by reducing respective dimensions in a radial direction and an axial direction, and makes it possible to increase the motor output, and a light amount adjustment device equipped with the motor or a motor mechanism.

In a first aspect of the present invention, there is provided a light amount adjustment device, comprising a plurality of aperture blades configured to adjust an opening amount of an opening, a drive member configured to drive the aperture blades, a cam member configured to restrict an amount of movement of the aperture blades being driven by the drive member, into the opening, a holding member that is fixed to the cam member in a manner sandwiching the drive member and the aperture blades therebetween, and a motor mechanism that is gear-connected to the drive member and is configured to transmit a driving force to the drive member, wherein the motor mechanism includes a rotor divided into a plurality of portions in a circumferential direction and alternately magnetized to different poles, a first coil wound into a hollow-cylindrical shape, a second coil wound into a hollow-cylindrical shape, and a stator formed of a soft magnetic material, wherein the stator is formed integrally with the holding member, and includes a support section configured to rotatably support a rotary shaft of the rotor, a first magnetic pole part, and a second magnetic pole part, wherein the first magnetic pole part extends toward an outer periphery of the rotor in a direction orthogonal to a rotational axis of the rotor, the first coil having the hollow cylindrical shape is inserted onto the first magnetic pole part from an extending end thereof, and the extending end is arranged in a manner opposed to the outer periphery of the rotor, wherein the second magnetic pole part extends toward the outer periphery of the rotor in the direction orthogonal to the rotational axis of the rotor, the second coil having the hollow cylindrical shape is inserted onto the second magnetic pole part from an extending end thereof, and the extending end is arranged in a manner opposed to the outer periphery of the rotor, and wherein the first magnetic pole part and the second magnetic pole part are arranged in respective circumferential directions of the rotor with an angle therebetween such that a line extending in the extending direction of the first magnetic pole part and a line extending in the extending direction of the second magnetic pole part intersect with each other.

In a second aspect of the present invention, there is provided a light amount adjustment device, comprising a plurality of aperture blades configured to adjust an opening amount of an opening, a drive member configured to drive the aperture blades, a cam member configured to restrict an amount of movement of the aperture blades being driven by the drive member, into the opening, a holding member that is fixed to the cam member in a manner sandwiching the drive member and the aperture blades therebetween, and a motor mechanism that is gear-connected to the drive member and is configured to transmit a driving force to the drive member, wherein the motor mechanism includes a rotor divided into a plurality of portions in a circumferential direction and alternately magnetized to different poles, a first coil wound into a hollow cylindrical shape, a second coil wound into a hollow-cylindrical shape, and a stator formed of a soft magnetic material, wherein the stator is formed integrally with the cam member, and includes a support section configured to rotatably support a rotary shaft of the rotor, a first magnetic pole part, and a second magnetic pole part, wherein the first magnetic pole part extends toward an outer periphery of the rotor in a direction orthogonal to a rotational axis of the rotor, the first coil having the hollow cylindrical shape is inserted onto the first magnetic pole part from an extending end thereof, and the extending end is arranged in a manner opposed to the outer periphery of the rotor, wherein the second magnetic pole part extends toward the outer periphery of the rotor in the direction orthogonal to the rotational axis of the rotor, the second coil having the hollow cylindrical shape is inserted onto the second magnetic pole part from an extending end thereof, and the extending end is arranged in a manner opposed to the outer periphery of the rotor, and wherein the first magnetic pole part and the second magnetic pole part are arranged in respective circumferential directions of the rotor with an angle therebetween such that a line extending in the extending direction of the first magnetic pole part and a line extending in the extending direction of the second magnetic pole part intersect with each other.

In a third aspect of the present invention, there is provided a motor, comprising a rotor divided into a plurality of portions in a circumferential direction and alternately magnetized to different poles, a first coil wound into a hollow cylindrical shape, a second coil wound into a hollow cylindrical shape, and a stator formed of a soft magnetic material, wherein the stator includes a support section configured to rotatably support a rotary shaft of the rotor, a first magnetic pole part, and a second magnetic pole part, wherein the first magnetic pole part extends toward an outer periphery of the rotor in a direction orthogonal to a rotational axis of the rotor, the first coil having the hollow cylindrical shape is inserted onto the first magnetic pole part from an extending end thereof, and the extending end is arranged in a manner opposed to the outer periphery of the rotor, wherein the second magnetic pole part extends toward the outer periphery of the rotor in the direction orthogonal to the rotational axis of the rotor, the second coil having the hollow cylindrical shape is inserted onto the second magnetic pole part from an extending end thereof, and the extending end is arranged in a manner opposed to the outer periphery of the rotor, and wherein the first magnetic pole part and the second magnetic pole part are arranged in respective circumferential directions of the rotor with an angle therebetween such that a line extending in the extending direction of the first magnetic pole part and a line extending in the extending direction of the second magnetic pole part intersect with each other.

In a fourth aspect of the present invention, there is provided a light amount adjustment device, comprising a plurality of aperture blades configured to adjust an opening amount of an opening, a drive member configured to drive the aperture blades, a cam member configured to restrict an amount of movement of the aperture blades being driven by the drive member, into the opening, a holding member that is fixed to the cam member in a manner sandwiching the drive member and the aperture blades therebetween, and a motor that is gear-connected to the drive member and is configured to transmit a driving force to the drive member, wherein the motor comprises a rotor divided into a plurality of portions in a circumferential direction and alternately magnetized to different poles, a first coil wound into a hollow cylindrical shape, a second coil wound into a hollow cylindrical shape, and a stator formed of a soft magnetic material, wherein the stator includes a support section configured to rotatably support a rotary shaft of the rotor, a first magnetic pole part, and a second magnetic pole part, wherein the first magnetic pole part extends toward an outer periphery of the rotor in a direction orthogonal to a rotational axis of the rotor, the first coil having the hollow cylindrical shape is inserted onto the first magnetic pole part from an extending end thereof, and the extending end is arranged in a manner opposed to the outer periphery of the rotor, wherein the second magnetic pole part extends toward the outer periphery of the rotor in the direction orthogonal to the rotational axis of the rotor, the second coil having the hollow cylindrical shape is inserted onto the second magnetic pole part from an extending end thereof, and the extending end is arranged in a manner opposed to the outer periphery of the rotor, and wherein the first magnetic pole part and the second magnetic pole part are arranged in respective circumferential directions of the rotor with an angle therebetween such that a line extending in the extending direction of the first magnetic pole part and a line extending in the extending direction of the second magnetic pole part intersect with each other.

According to the present invention, it is possible to reduce the dimensions of the motor in the radial direction and the axial direction to thereby reduce the size of the motor and increase the motor output.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
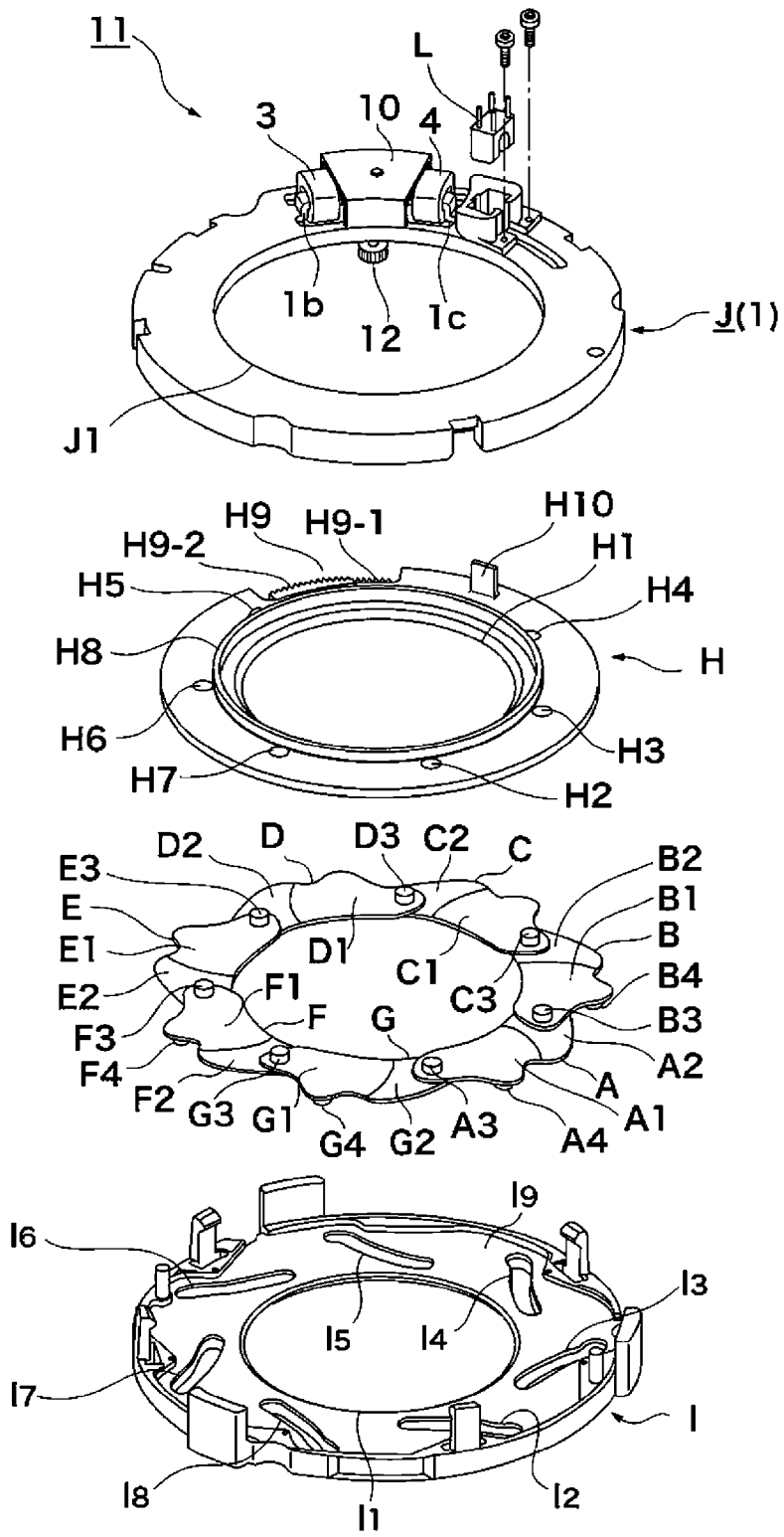
FIG. 1 is an exploded perspective view of a light amount adjustment device according to a first embodiment of the present invention.

FIG. 1 is an exploded perspective view of a light amount adjustment device according to a first embodiment of the present invention.

In FIG. 1, a plurality of aperture blades A to G each include a thin plate-shaped blade base portion formed by first base portions A1 to G1 and second base portions A2 to G2, respectively, which have light shielding properties and adjust the amount of aperture opening. Further, the aperture blades A to G have first shafts A3 to G3 provided on one surfaces of the first base portions A1 to G1 and second shafts A4 to G4 provided on the other surfaces of the same (some of which are not shown), respectively. The blade base portions, the first shafts A3 to G3, and the second shafts A4 to G4 (C4, D4, and E4 are not shown) are integrally molded of a synthetic resin.

A rotary member H is a member for driving the aperture blades A to G, and is formed into a ring shape having an opening H1 in a central portion thereof. The rotary member H is provided with holes H2 to H7, a protruding portion H8, an arc-shaped gear H9, and a light shielding portion H10.

A cam member I is a ring-shaped member having an opening I1 in a central portion thereof, and has a base plate 19 provided with cam groove portions I2 to I8 which control the amount of movement of each of the aperture blades A to G, which are driven by the rotary member H, into the opening I1.

This opening I1 defines a maximum amount of aperture opening adjusted by the aperture blades A to G, and therefore, the cam member I also serves as an opening base plate (base portion) which defines the maximum amount of the aperture opening. Note that the maximum amount of the aperture opening adjusted by the aperture blades A to G may be defined by a member different from the cam member I.

A holding member J is a ring-shaped member having an opening J1 in a central portion thereof. The holding member J has a portion provided with a motor mounting portion, not shown, formed of a soft magnetic material, and is also used as a stator 1 of a motor mechanism 11, referred to hereinafter (therefore, the holding member is denoted by J(1)). To this end, the stator 1 includes a support section 1a (see FIG. 2) formed with a supporting hole for rotatably supporting a rotary shaft 8 of a rotor 6, and a first magnetic pole part 1b and a second magnetic pole part 1c.

The motor mechanism 11 is for driving the rotary member H. The motor mechanism 11 is implemented by a stepping motor and is mounted on the motor mounting portion of the holding member J. In a state in which the motor mechanism 11 is mounted on the holding member J, the rotary shaft 8 (see FIG. 2) of the rotor 6 extends through a hole (not shown) of the holding member J, and has a pinion 12 fixed to a front end thereof. The pinion 12 meshes with the gear H9 of the rotary member H. This causes the rotary member H and the motor mechanism 11 to be gear-connected to each other, whereby a driving force from the motor mechanism 11 is transmitted to the rotary member H. Details of the motor mechanism 11 will be described hereinafter with reference to FIGS. 2 to 5.

An initial position sensor L is mounted on the motor mechanism 11, and detects a state in which the light shielding portion H10 of the rotary member H has moved into or out of the initial position sensor L to thereby determine whether or not the rotary member H is in the initial position.

The holding member J is fixed to the cam member I in a manner sandwiching the rotary member H and the aperture blades A to G therebetween, and thereby functions as a retainer for retaining the rotary member H and the aperture blades A to G in a direction of the optical axis. The protruding portion H8 of the rotary member H is rotatably fitted in the opening J1 of the holding member J. Further, the first shafts A3 to G3 of the aperture blades A to G are pivotally fitted in holes H2 to H8 of the rotary member H, respectively, and the second shafts A4 to G4 are slidably fitted in the cam groove portions I2 to I8 of the cam member I, respectively.

The aperture blades A to G are arranged about the optical axis at equally-spaced intervals in the circumferential direction, and have the first base portions A1 to G1 and second base portions A2 to G2, which have light shielding properties, in a manner overlapping each other, whereby an area of the aperture opening is made variable, and as the overlapping areas are larger, the area of the aperture opening is smaller.

Figure 2:
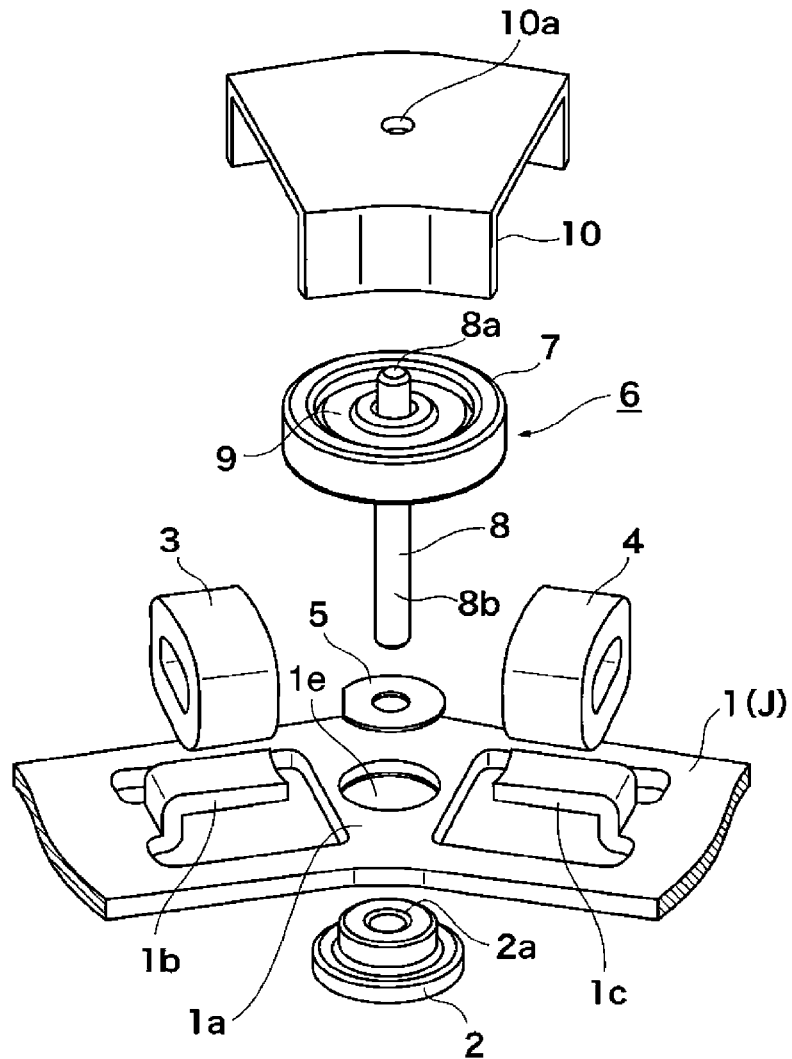
FIG. 2 is an exploded perspective view of a motor mechanism appearing in FIG. 1.
Figure 3:
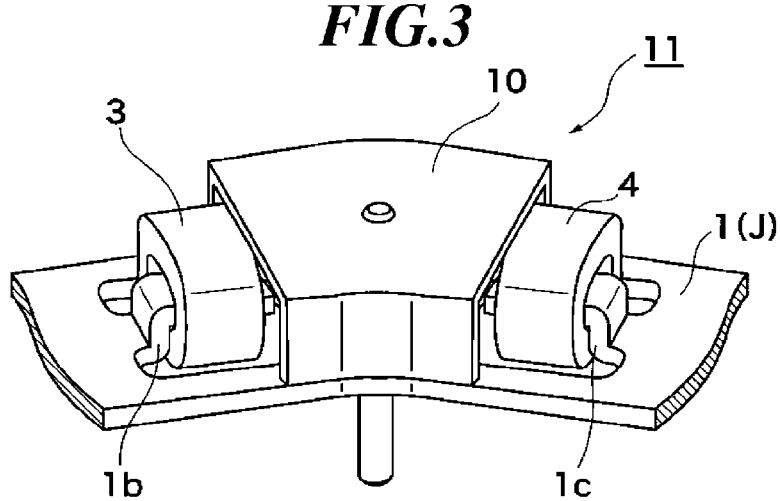
FIG. 3 is a perspective view of the motor mechanism shown in FIG. 2 in an assembled state.
Figure 4:
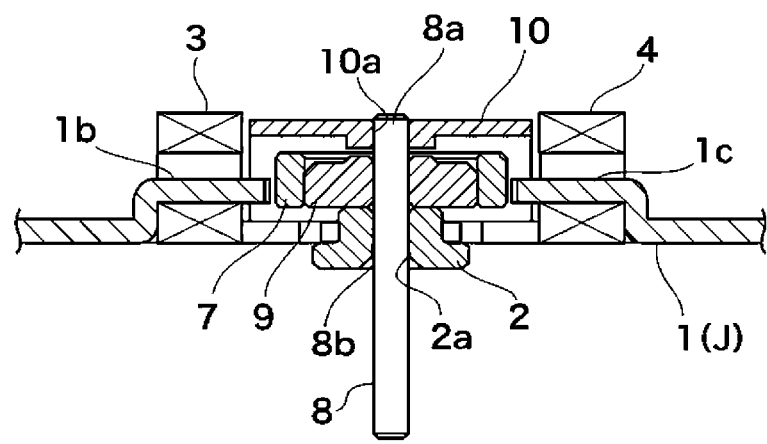
FIG. 4 is a cross-sectional view of the motor mechanism shown in FIG. 3, taken along an axial direction.
Figure 5:
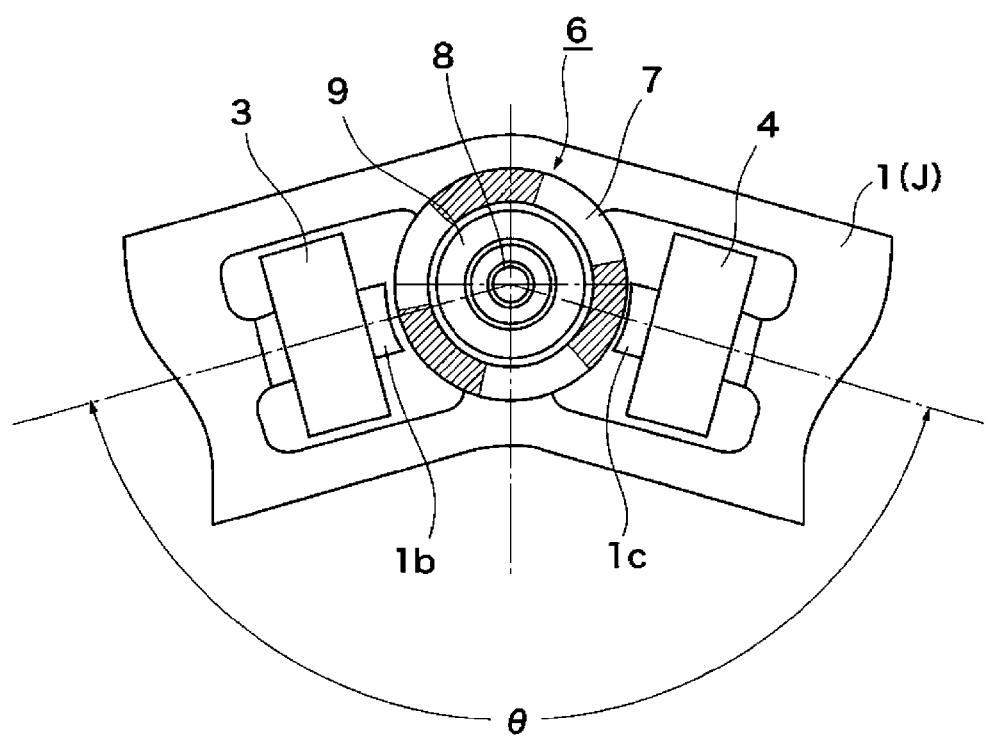
FIG. 5 is a plan view useful in explaining an operation of the motor mechanism.

Next, a description will be given of the motor mechanism 11 with reference to FIGS. 2 to 5. FIG. 2 is an exploded perspective view of the motor mechanism 11, FIG. 3 is a perspective view of the motor mechanism 11 in an assembled state, FIG. 4 is a cross-sectional view of the motor mechanism 11, taken along an axial direction, and FIG. 5 is a plan view useful in explaining an operation of the motor mechanism 11.

In FIGS. 2 to 5, the rotor 6 includes the rotary shaft 8 formed of a magnetic material, a core 9 formed of a magnetic material, and a permanent magnet 7. The rotary shaft 8 is fitted in an inner peripheral portion of the core 9 by pressure or by adhesion, and the core 9 is fitted in an inner peripheral portion of the permanent magnet 7 by pressure or by adhesion. Note that the permanent magnet 7 may be integrally molded with the rotary shaft 8 and the core 9, as a plastic molding.

The stator 1 is formed integrally with the holding member J by forming the stator 1 as part of the holding member J using the soft magnetic material. The stator 1 includes the support section 1*a* having a fitting hole 1*e* formed in a central portion thereof, the first magnetic pole part 1*b* integrally or magnetically connected with the support section 1*a*, and the second magnetic pole part 1*c* integrally or magnetically connected with the support section 1*a*. A coil 3 is wound around the first magnetic pole part 1*b*, and a coil 4 is wound around the second magnetic pole part 1*c*. A bearing 2 formed of a magnetic material is press-fitted in the fitting hole 1*e* of the support section 1*a*. In this arrangement, the coil 3 corresponds to an example of a first coil of the present invention, and the coil 4 corresponds to an example of a second coil of the present invention.

The rotary shaft 8 of the rotor 6 has a lower end 8*b* rotatably supported by a fitting hole 2*a* of the bearing 2, and an upper end 8*a* rotatably supported by a shaft hole 10*a* of a cover 10. A washer 5 formed of a nonmagnetic material is interposed between the bearing 2 and the core 9 of the rotor 6 in order to prevent a rotational load from being increased by generation of a magnetic attractive force. The cover 10 is fixed to the stator 1. The motor mechanism 11 is thus constructed.

Next, a detailed description will be given of components of the above-mentioned motor mechanism 11.

The stator 1 (yoke) is formed integrally with the holding member J by forming the stator 1 as part of the holding member J using a plate material (e.g. thickness t=0.5 mm±0.03 mm) of a soft magnetic material. The stator 1 includes the support section 1*a* having the fitting hole 1*e* formed in the central portion, the first magnetic pole part 1*b* having the coil 3 wound therearound, and the second magnetic pole part 1*c* having the coil 4 wound therearound. The first magnetic pole part 1*b* and the second magnetic pole part 1*c* are integrally or magnetically connected with the support section 1*a*, respectively. In the present embodiment, the fitting hole 1*e* of the support section 1*a*, the first magnetic pole part 1*b*, and the second magnetic pole part 1*c* are formed by press working.

The first magnetic pole part 1*b* is formed by being bent from the support section 1*a* in the direction of the rotational axis of the rotor 6, and further being bent in a direction orthogonal to the rotational axis of the rotor 6. As a result, the first magnetic pole part 1*b* extends toward an outer periphery of the rotor 6 in the direction orthogonal to the rotational axis of the rotor 6, and the coil 3 is inserted thereon from an extending end. In a state in which the coil 3 is thus inserted, the extending end of the first magnetic pole part 1*b* protrudes from the coil 3, and an end face of the extending end of the first magnetic pole part 1*b* is positioned close to an outer periphery of the permanent magnet 7 in a manner opposed thereto.

The second magnetic pole part 1*c* formed by being bent from the support section 1*a* in the direction of the rotational axis of the rotor 6, and further being bent in the direction orthogonal to the rotational axis of the rotor 6. As a result, the second magnetic pole part 1*c* also extends toward the outer periphery of the rotor 6 in the direction orthogonal to the rotational axis of the rotor 6, and the coil 4 is inserted thereon from the extending end. In a state in which the coil 4 is thus inserted, the extending end of the second magnetic pole part 1*c* protrudes from the coil 4, and an end face of the extending end of the second magnetic pole part 1*c* is positioned close to the outer periphery of the permanent magnet 7 in a manner opposed thereto.

Note that in the present embodiment, the first magnetic pole part 1*b* and the second magnetic pole part 1*c* are arranged such that a line extending in the extending direction of the first magnetic pole part 1*b* and a line extending in the extending direction of the second magnetic pole part 1*c* intersect with each other.

More specifically, as shown in FIG. 5, the first magnetic pole part 1*b* and the second magnetic pole part 1*c* are arranged in a manner away from each other in the circumferential direction at an angle of $\theta=(180/NA+A\times 360/NA)°$, i.e. $(30+60\times A)°$. A in the equation represents an integer, and in the present embodiment, it is assumed that NA=6, A=2, and $\theta=150°$.

The bearing 2 is formed of a magnetic material, and has the fitting hole 2*a* through which the lower end 8*b* of the rotary shaft 8 is inserted.

The coil 3, which is wound into a hollow-cylindrical shape, is inserted from the extending end of the first magnetic pole part 1*b* whereby it is disposed such that a central axis thereof is orthogonal to the rotational axis of the rotor 6. The coil 4, which is wound into a hollow-cylindrical shape, is inserted from the extending end of the second magnetic pole part 1*c* whereby it is disposed such that a central axis thereof is orthogonal to the rotational axis of the rotor 6.

The washer 5 is formed of a non-magnetic material and is disposed between the support section 1*a* of the stator 1 and the rotor 6. This causes a slight magnetic gap to be formed between the support section 1*a* and the rotor 6 to thereby prevent the stator 1 and the rotor 6 from be attracted to each other by a magnetic force in the axial direction.

The permanent magnet 7 is circumferentially divided into a plurality of portions (in the present embodiment, 6 portions: see FIG. 5), which are magnetized such that N poles and S poles alternate with each other. The permanent magnet 7 is formed by molding a plastic magnet material e.g. by injection to thereby make it possible to largely reduce the thickness thereof in the radial direction.

The inner peripheral surface of the permanent magnet 7 has a weaker magnetization distribution than the outer peripheral surface thereof, or is not magnetized at all, or is magnetized to a pole opposite to the outer peripheral surface, i.e. when a portion of the outer peripheral surface is magnetized to the S pole, the inner peripheral surface of the portion is magnetized to the N pole.

The rotary shaft 8 is formed of a soft magnetic material, and is rigidly fixed to the inner periphery of the permanent magnet 7. The upper end 8*a* of the rotary shaft 8 is rotatably fitted in the shaft hole 10*a* of the cover 10, and the lower end 8*b* is rotatably fitted through the fitting hole 2*a* of the bearing 2 fitted in the fitting hole 1*e* of the support section 1*a* of the stator 1. The pinion 12 is fixed to the lower end 8*b* of the rotary shaft 8 protruding from the fitting hole 2*a* of the bearing 2.

The core 9 is formed of a soft magnetic material, and forms an inner yoke with respect to the outer yoke formed by the first magnetic pole part 1*b* and the second magnetic pole part 1*c* of the stator 1, thereby forming a magnetic circuit in cooperation with the first magnetic pole part 1*b* and the second magnetic pole part 1*c*.

The cover 10 is fixed to the stator 1 e.g. by adhesion or with screws to cover the rotor 6.

Next, a description will be given of an operation of the motor mechanism 11 with reference to FIG. 5.

In FIG. 5, when the coil 4 is energized, the second magnetic pole part 1*c* of the stator 1 is excited, and the rotor 6 is stopped in a position where one of the poles of the portions divided in the circumferential direction of the permanent magnet 7 of the rotor 6 is opposed to the second magnetic pole part 1c (initial energization).

For example, when the coil 4 is energized in a positive direction, the second magnetic pole part 1c is excited to the S pole, so that the rotor 6 is stopped in a position where the N pole of a portion of the permanent magnet 7 is opposed to the second magnetic pole part 1c.

A magnetic path is formed such that magnetic flux generated by energization of the coil 4 flows through the second magnetic pole part 1c of the stator 1, an air gap between the second magnetic pole part 1c and the permanent magnet 7, the permanent magnet 7, and the core 9, and reaches the support section 1a.

When the coil 3 is energized in the positive direction in a state in which the coil 4 is energized in the positive direction, the first magnetic pole part 1b is also excited to the S pole, whereby the rotor 6 is rotated about the axis of the rotary shaft 8 in a clockwise direction as viewed in FIG. 5, and is moved to a position where the N poles of the permanent magnet 7 are equally opposed to the first and second magnetic pole parts 1b and 1c, respectively.

As described above, first-phase excitation and second-phase excitation are repeated such that the coil 4 is energized in the positive direction, the coil 3 is energized in the positive direction, and energization of the coil 3 is stopped, whereby it is possible to rotate the rotor 6 by a predetermined angle.

Figure 6:
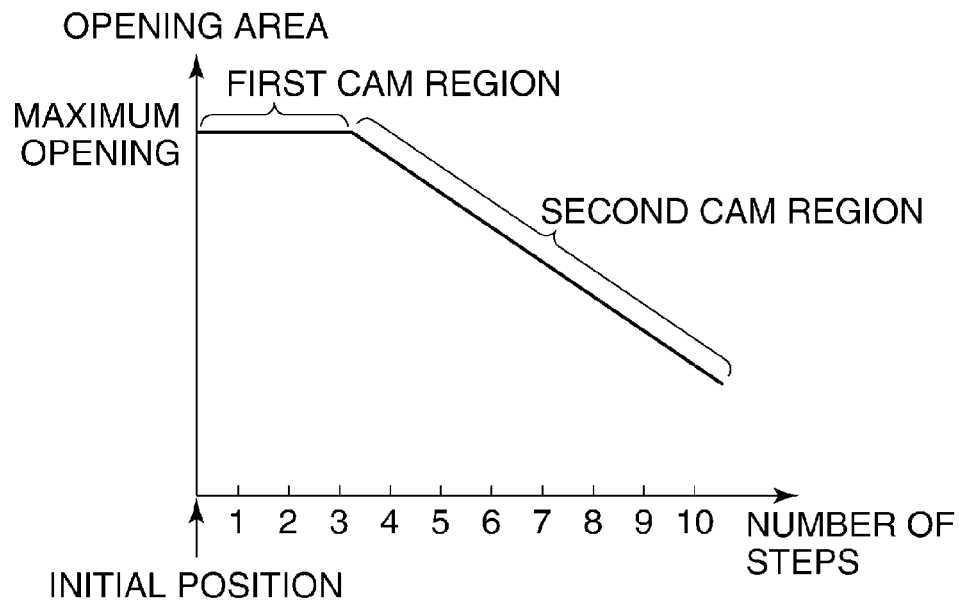
FIG. 6 is a graph showing a relationship between a rotational position of a rotary member and an area of aperture opening, in the light amount adjustment device according to the first embodiment.
Figure 7:
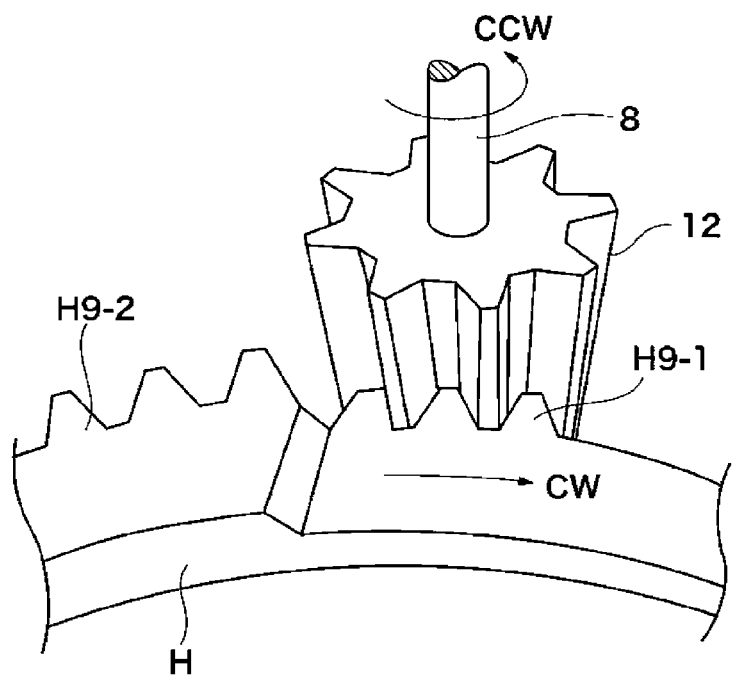
FIG. 7 is a perspective view of the rotary member and a pinion in a meshed state.

FIG. 6 is a graphic diagram showing a relationship between a rotational position of the rotary member H and an area of aperture opening in the light amount adjustment device shown in FIG. 1, and FIG. 7 is a perspective view of the rotary member H and the pinion 12 in a meshed state.

In FIG. 6, when the initial position sensor L detects an inserted state of the light shielding portion H10 of the rotary member H, the aperture blades A to G are in respective positions retreated outward of the opening 11 along the cam groove portions I2 to I8 of the cam member I and hence the maximum opening is not reduced.

The motor mechanism 11 drives the pinion 12 by a predetermined number of steps (three steps in the present example) from this retreated position in a direction indicated by an arrow CCW in FIG. 7 to thereby drive the rotary member H in a direction indicated by an arrow CW. When the rotary member H is driven in the direction indicated by the arrow CW, the aperture blades A to G are pivotally moved along the cam groove portions I2 to I8 of the cam member I to cover the opening I1, thereby forming a predetermined area of the aperture opening (covering position).

In the present embodiment, a first cam region and a second cam region are defined which are associated with respective ranges of position of each of the second shafts A4 to G4 in an associated one of the cam groove portions I2 to I8 of the cam member I. The first cam range is defined as a range of the position in which the rotary member H is within three steps from the initial position where the initial position sensor L detects the inserted state of the light shielding portion H10 of the rotary member H, thereby placing each of the aperture blades A to G in the retreated position. The second cam region is defined as a range of the position in which the rotary member H is beyond three steps from the initial position, thereby placing the aperture blades A to G in the covering position.

In FIG. 7, the gear H9 of the rotary member H includes a first gear H9-1 and a second gear H9-2 which are different in thickness in the axial direction (the number of teeth, a pitch, and the like other than the thickness in the axial direction are the same). The first gear H9-1, which is thinner in the thickness in the axial direction (hereinafter referred to as the thin gear), meshes with the pinion 12 when the aperture blades A to G are in the retreated position (corresponding to the first cam region). On the other hand, the second gear H9-2, which is thicker in the thickness in the axial direction (hereinafter referred to as the thick gear), meshes with the pinion 12 when the aperture blades A to G are in the covering position (corresponding to the second cam region).

The pinion 12 has a conical shape which is tapered toward a front end thereof, and hence when the pinion 12 meshes with the thin gear H9-1, a front end portion thereof which is small in diameter meshes with the thin gear H9-1, which increases backlash. On the other hand, when the pinion 12 meshes with the thick gear H9-2, a base portion thereof which is large in diameter meshes with the thick gear H9-2, and the backlash is smaller than that in the case where the front end which is small in diameter meshes with the thin gear H9-1. That is, assuming that an amount of backlash amount in the case of the pinion 12 meshing with the thin gear H9-1 is Y1, and an amount of backlash in the case where the pinion 12 meshing with the thick gear H9-2 is Y2, the rotary member H and the pinion 12 are constructed such that Y1>Y2 holds.

Next, a description will be given of an operation of the light amount adjustment device according to the first embodiment in a case where it is applied to a digital camera.

Note that in the following description, a state in which the initial position sensor L has detected insertion of the light shielding portion H10 of the rotary member H is defined as the initial position of the rotary member H.

In still image shooting, this initial position is always set as a start position. The motor mechanism 11 is driven from the initial position to a desired aperture position so as to make the aperture equal to a predetermined aperture value. The motor mechanism 11 is rotated anticlockwise as viewed in FIG. 1 (CCW direction in FIG. 7) whereby the pinion 12 is rotated, and since the pinion 12 is in mesh with the gear H9 of the rotary member H, the rotary member H is rotated clockwise as viewed in FIG. 1 (CW direction in FIG. 7).

Therefore, in the first cam region in which the aperture blades A to G are each placed in the retreated position, the backlash is increased since the small diameter portion of the front end portion of the pinion 12 is in mesh with the thin gear H9-1 of the rotary member H. This prevents a driving load from being increased even when there is variation in accuracy between the respective shapes of components, so that the motor mechanism 11 can be smoothly started, and it is possible to perform a high-speed stop-down operation to a predetermined aperture value thereafter.

Although the present embodiment is configured such that the pinion 12 is in mesh with the thin gear H9-1 of the rotary member H when the rotary member H is within three steps from the initial position, this is not limitative, but for example, the steps may be two. Further, it is not necessary to increase the backlash throughout the first cam region. That is, if a large backlash is ensured at least in a range of the start of the movement (only in a predetermined range in the vicinity of the initial position), it is possible to smoothly start the motor mechanism 11, and perform the high-speed stop-down operation to a predetermined aperture value thereafter.

Then, after being smoothly started, the motor mechanism 11 is further driven anticlockwise to rotate the rotary member H clockwise as viewed in FIG. 1 (CW direction in FIG. 7). Then, since the first shafts A3 to G3 of the aperture blades A to G are fitted in the holes H2 to H7 of the rotary member H, along with respective operations of the first shafts A3 to G3, the second shafts A4 to G4 are moved along the cam groove portions I2 to I8 of the cam member I, respectively, whereby the aperture blades A to G are each moved to the covering position. This is a movement of each of the second shafts A4 to G4 in the second cam region for making the aperture opening equal to a predetermined aperture opening value.

In the second cam region, the large diameter portion of the pinion 12, which is the base portion of the pinion 12 in the axial direction, meshes with the thick gear H9-2 of the rotary member H, which makes the urging force of the pinion 12 in the radial direction larger compared with when the small diameter portion of the pinion 12 meshes with the thin gear H9-1 of the rotary member H, and hence the backlash becomes small. If the backlash is small, when there is variation in accuracy between the respective shapes of components, it is expected that the driving load is increased, but there is no problem because the rotation of the rotary member H has been sufficiently accelerated in the second cam region. As a result, in the still image shooting, it is possible to perform the high-speed stop-down operation having a less release time lag.

After termination of still image shooting, to return the aperture blades A to G to respective positions corresponding to the initial position of the rotary member H, a control unit, not shown, which controls a rotational amount of the motor mechanism 11, drives the motor mechanism 11 in a direction opposite from a stop-down direction (toward the covering position). In this case, although the driving of the motor mechanism 11 is started from the second cam region, since the shooting has been terminated, it is not necessary to drive the motor mechanism 11 at high speed. For this reason, even when the backlash between the large diameter portion of the pinion 12 and the thick gear H9-2 of the rotary member H is small, and even if there is variation in accuracy between the respective shapes of components, causing an increase in the driving load, the operation never becomes unstable since the high-speed driving is not performed.

Next, in moving image shooting, the motor mechanism 11 is always driven in the second cam region, so that it is necessary to sequentially change the aperture opening value according to the depth of field which changes from moment to moment. A sudden change rarely occurs in the depth of field, and hence, although it is not desired to change the aperture value at high speed, it is necessary to increase the accuracy and fineness of the aperture value. In the second cam region, the pinion 12 meshes with the thick gear H9-2 of the rotary member H, and hence the backlash is small. Therefore, it is possible to perform an aperture adjustment operation with high accuracy and fineness.

Further, the first gear H9-1 and the second gear H9-2, different in thickness in the axial direction, are formed on the gear H9 of the rotary member H, whereby the motor mechanism 11 is configured such that a backlash amount A1 in the first cam region>a backlash amount A2 in the second cam region holds.

It can be also envisaged that the backlash amount is made variable by changing an amount of displacement of the gear H9, while making the gear H9 of the rotary member H uniform in thickness in the axial direction. That is, the backlash amount can be varied by configuring such that [the amount of displacement of the gear of the rotary member H in the first cam region]<[the amount of displacement of the gear of the rotary member H in the second cam region].

As described above, in the present embodiment, part of the holding member J forming the light amount adjustment device is formed as the stator 1 of the motor mechanism 11, and the coils 3 and 4 are wound around the first and second magnetic pole parts 1b and 1c of the stator 1 such that the central axis thereof is orthogonal to the rotational axis of the rotor 6. Therefore, when a large torque is needed, it is possible to increase coil space without increasing the dimension of the motor mechanism 11 in the axial direction. This makes it possible to reduce the dimension of the light amount adjustment device including the motor mechanism 11 in the axial direction, and it is possible to increase the motor output of the motor mechanism 11.

Further, in the present embodiment, since the stator 1 is formed as part of the holding member, it is possible to reduce the dimension of the light amount adjustment device including the motor mechanism 11 in the axial direction, and it is possible to realize low costs.

Further, in the present embodiment, since the first magnetic pole part 1b and the second magnetic pole part 1c are formed on the single stator 1, it is possible to increase the accuracy in the locations of the first magnetic pole part 1b and the second magnetic pole part 1c.

Further, in the present embodiment, since the first magnetic pole part 1b and the second magnetic pole part 1c are arranged at the angle of $\theta=(30+60 \times A)°$ with respect to the rotational axis of the rotor 6, it is possible to arrange the first magnetic pole part 1b and the second magnetic pole part 1c on the same plane. As a result, the rotor 6 can be reduced in the dimension in the axial direction.

Further, since the coils 3 and 4 are arranged such that the central axis of the coil 3 and that of the coli 4 are orthogonal to the rotational axis of the rotor 6, it is possible to downsize the motor in the axial direction of the rotor 6.

Further, in the present embodiment, the first magnetic pole part 1b and the second magnetic pole part 1c are arranged on the same plane which is orthogonal to the rotational axis of the rotor 6. Therefore, the two magnetic pole parts 1b and 1c cause the magnetic flux to act on the same portion of the permanent magnet 7 of the rotating rotor 6, which make it possible to ensure the stable rotation without being adversely affected by variation in magnetization or the like.

Further, in the present embodiment, the magnetic path is formed such that the magnetic flux generated by energization of the coil 4 flows through the second magnetic pole part 1c of the stator 1, the air gap between the second magnetic pole part 1c and the permanent magnet 7, the permanent magnet 7, and the core 9, and reaches the support section 1a. This makes it possible to cause the magnetic flux generated by exciting the coil to effectively act on the permanent magnet 7, whereby it is possible to increase the motor output of the motor mechanism 11.

Further, in the present embodiment, since the magnet diameter of the permanent magnet 7 determines the maximum diameter of the motor mechanism 11, the dimension of the motor mechanism 11 in the radial direction can be made smaller than a conventional motor mechanism which uses the substantially U-shaped yokes, insofar as the diameter of the permanent magnet 7 is the same. Note that the magnet diameter of the permanent magnet 7 is a main factor for securing torque, and it is basically considered that the torque is proportional to the square of the magnet diameter of the permanent magnet 7.

Next, a description will be given of a second embodiment of the present invention with reference to FIGS. 8 to 12. The present embodiment differs from the first embodiment in that the motor mechanism 11 is replaced by a stepping motor 11A as a separate component. That is, although in the first embodiment, the motor mounting portion of a soft magnetic material, which is formed as part of the holding member J, is also used as the stator 1 of the motor mechanism 11, in the present embodiment, the stepping motor 11A including a stator 1A is separately formed from the holding member J, and the stator 1A is formed with mounting holes 1d to 1f, referred to hereinafter, for mounting the stator 1A to the holding member J with screws or the like, to thereby fix the stepping motor 11A to the holding member J with the screws or the like.

Figure 8:
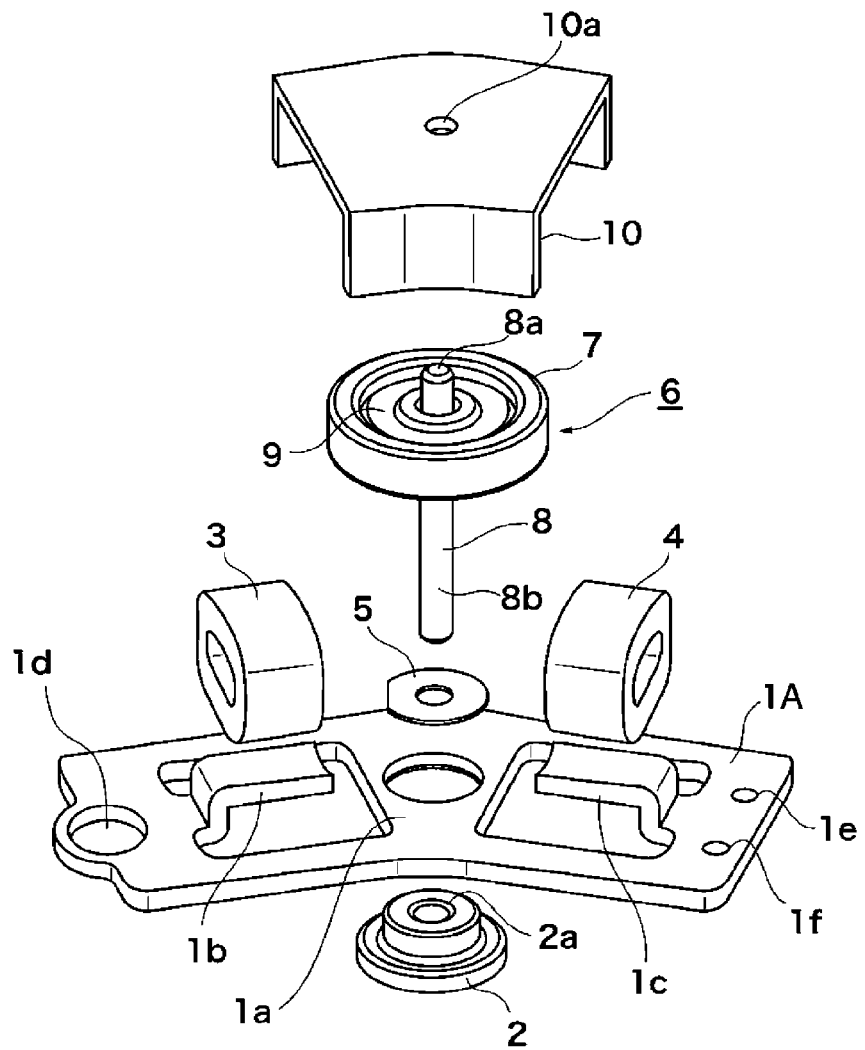
FIG. 8 is an exploded perspective view of a stepping motor of a light amount adjustment device according to a second embodiment of the present invention.
Figure 9:
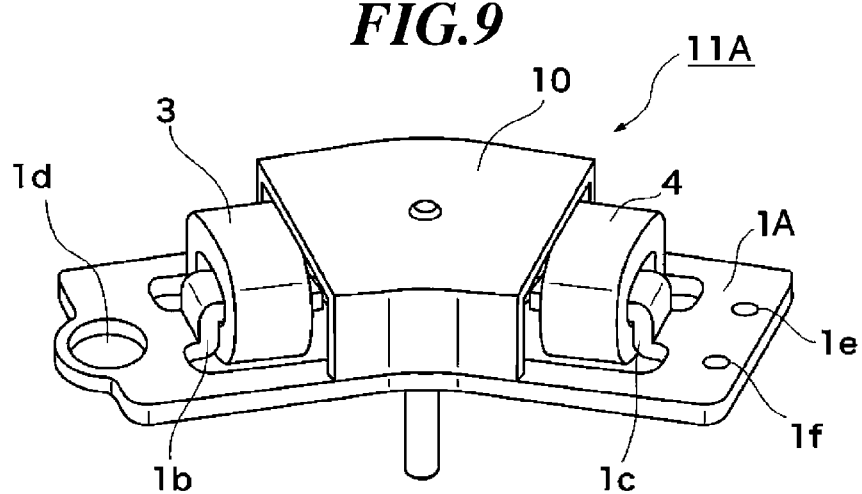
FIG. 9 is a perspective view of the stepping motor shown in FIG. 8 in an assembled state.
Figure 10:
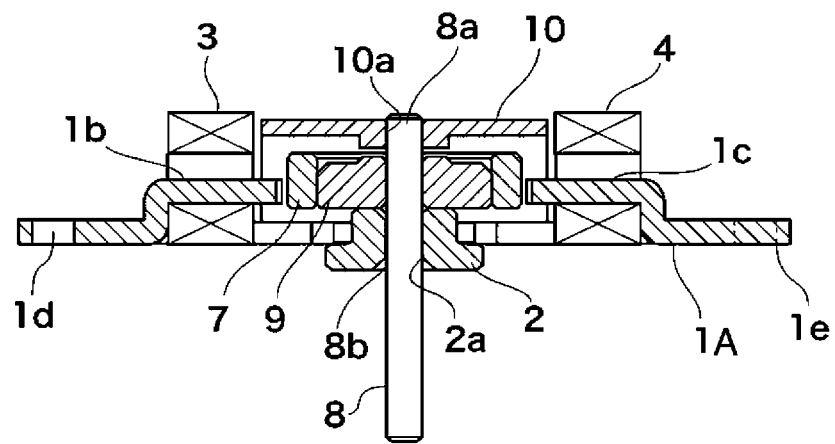
FIG. 10 is a cross-sectional view of the stepping motor shown in FIG. 9, taken along an axial direction.
Figure 11:
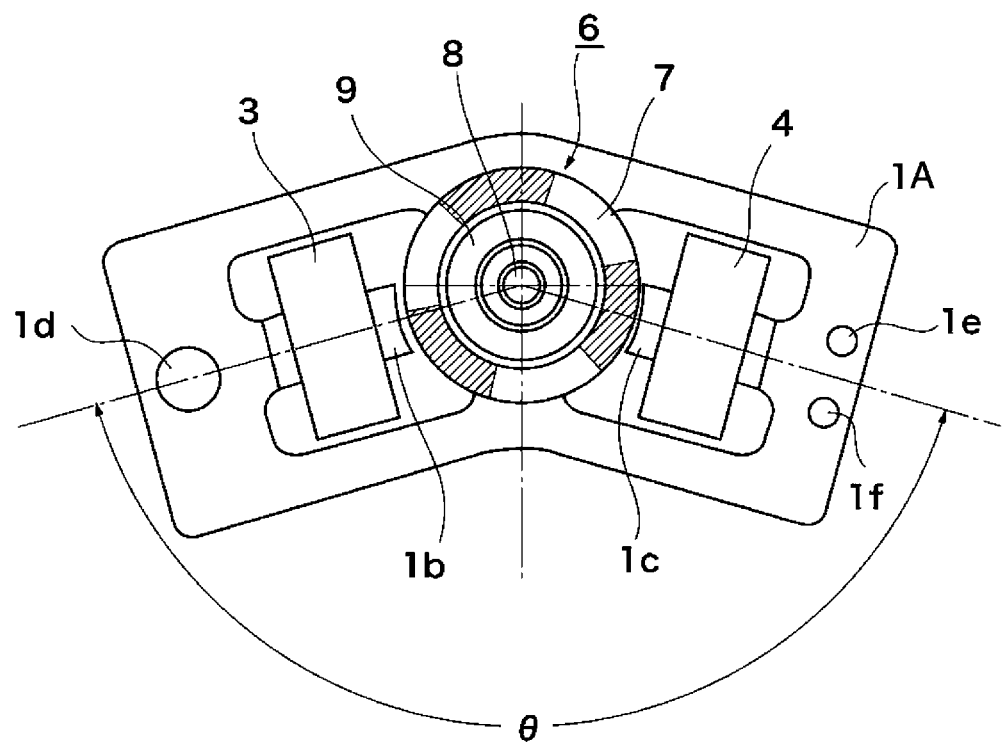
FIG. 11 is a plan view useful in explaining an operation of the stepping motor.

Hereinafter, a description will be given of the stepping motor 11A which distinguishes the present embodiment from the first embodiment. Note that the motor mechanism 11 in the first embodiment and the stepping motor 11A in the second embodiment differ from each other only in that the stator is formed integrally with the holding member J or separately formed, and hence basically, only different points from the first embodiment will be described, and redundant description of similar component elements is omitted. FIG. 8 is an exploded perspective view of the stepping motor 11A which is equipped in a light amount adjustment device according to the second embodiment of the present invention, FIG. 9 is a perspective view of the stepping motor 11A in an assembled state, FIG. 10 is a cross-sectional view of the stepping motor 11A, taken along an axial direction, and FIG. 11 is a plan view useful in explaining an operation of the stepping motor 11A.

As shown in FIGS. 8 to 11, the stepping motor 11A of the present embodiment includes the rotor 6, the coils 3 and 4, and the stator 1A.

The stator 1A includes the support section 1a having the fitting hole formed in the central portion, the first magnetic pole part 1b integrally or magnetically connected with the support section 1a and having the coil 3 wound therearound, and the second magnetic pole part 1c integrally or magnetically connected with the support section 1a and having the coil 4 wound therearound. The bearing 2 formed of a magnetic material is press-fitted in the fitting hole 1e of the support section 1a.

Next, a detailed description will be given of the component elements of the above-mentioned stepping motor 11A.

The stator 1A (yoke) is formed of a plate material (e.g. thickness t=0.5 mm±0.03 mm) of a soft magnetic material. The stator 1A is formed with the support section 1a, the first magnetic pole part 1b for having the coil 3 wound therearound, and the second magnetic pole part 1c for having the coil 4 wound therearound, as mentioned above. In the present embodiment, the fitting hole 1e of the support section 1a, the first magnetic pole part 1b, and the second magnetic pole part 1c are formed by press working. The stator 1A is further formed with the mounting holes 1d to 1f for mounting the stator 1A to a motor mounting portion J3 of the holding member J of the light adjustment device, referred to hereinafter, with screws or the like.

Other component elements of the stepping motor 11A are identical to those of the motor mechanism 11 of the first embodiment, and the operation of the stepping motor 11A is also identical to that of the motor mechanism 11, and hence description thereof is omitted.

Figure 12:
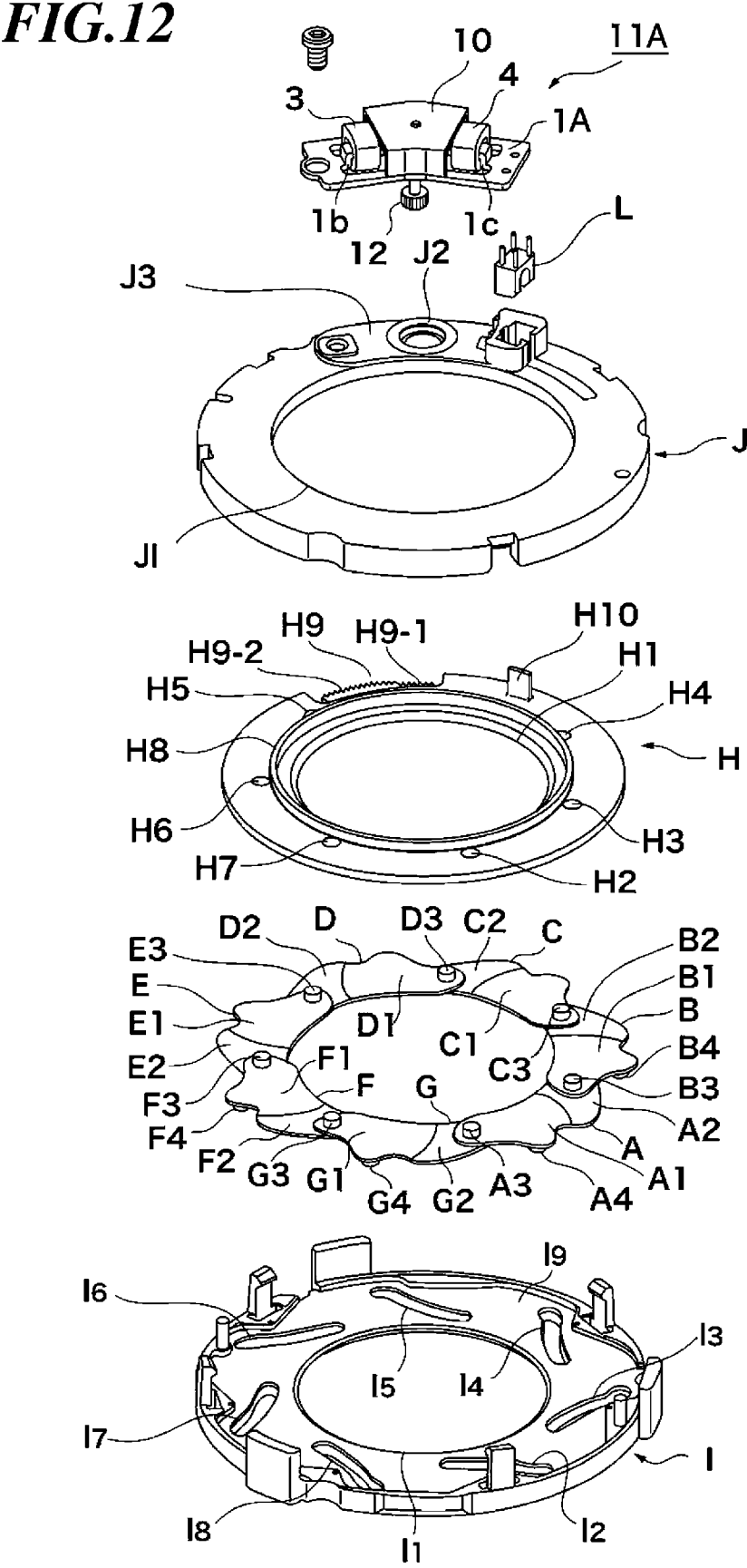
FIG. 12 is an exploded perspective view of the light amount adjustment device according to the second embodiment in which the stepping motor is mounted.

Next, a description will be given of the light adjustment device on which the stepping motor 11A having the above-described arrangement is mounted, with reference to FIG. 12. FIG. 12 is an exploded perspective view of the light amount adjustment device on which the stepping motor 11A is mounted. Hereinafter, only main different points from the light amount adjustment device according to the first embodiment will be described.

The holding member J is a ring-shaped member having the opening J1 in the central portion thereof, and is provided with the motor mounting portion J3 on which the stator 1A of the stepping motor 11A is mounted, and a hole J2. In a state in which the stepping motor 11A is mounted on the motor mounting portion J3, rotary shaft 8 of the rotor 6 extends through the hole J2 and has the pinion 12 fixed to the front end thereof. The pinion 12 meshes with the gear H9 of the rotary member H. This causes the rotary member H and the stepping motor 11A to be gear-connected to each other, whereby the driving force from the stepping motor 11A is transmitted to the rotary member H.

The initial position sensor L is mounted on the holding member J, and detects a state in which the light shielding portion H10 has moved into or out of the initial position sensor L to thereby determine whether or not the rotary member H is in the initial position.

The relationship between the rotational position of the rotary member H and the aperture opening area in the light amount adjustment device shown in FIG. 12 is the same as the relationship in the first embodiment represented by the graph in FIG. 6, and the meshed state of the rotary member H and the pinion 12 is also the same as that shown in the perspective view in FIG. 7, and hence description thereof is omitted.

Next, the operation of the light amount adjustment device equipped with the stepping motor 11A and applied to a digital camera is also the same as in the first embodiment except that the motor mechanism 11 is changed to the stepping motor 11A separately formed and mounted, and hence description thereof is omitted.

As described above, in the present embodiment, the coils 3 and 4 are wound around the first and second magnetic pole parts 1b and 1c of the stator 1A, respectively, such that the central axes thereof are orthogonal to the rotational axis of the rotor 6. With this arrangement, when a large torque is needed, it is possible to increase coil space without increasing the dimension of the stepping motor 11A in the axial direction. This makes it possible to reduce the dimension of the stepping motor 11A in the axial direction, and increase the motor output from the stepping motor 11A.

Further, in the present embodiment, the first magnetic pole part 1b and the second magnetic pole part 1c are formed on the single stator 1A, and hence it is possible to increase the accuracy in the locations of the first magnetic pole part 1b and the second magnetic pole part 1c.

Further, in the present embodiment, since the first magnetic pole part 1b and the second magnetic pole part 1c are arranged at the angle of θ=(30+60×A)° with respect to the rotational axis of the rotor 6, it is possible to arrange the first magnetic pole part 1b and the second magnetic pole part 1c on the same plane. As a result, it is possible to reduce the dimension of the rotor 6 in the axial direction.

Further, the coils 3 and 4 are arranged such that the central axis of the coil 3 and that of the coil 4 are orthogonal to the rotational axis of the rotor 6, and hence it is possible to downsize the motor in the axial direction of the rotor 6.

Further, in the present embodiment, the first magnetic pole part 1b and the second magnetic pole part 1c are arranged on the same plane which is orthogonal to the rotational axis of the rotor 6. Therefore, since the two magnetic pole parts 1b and 1c cause the magnetic flux to act on the same portion of the permanent magnet 7 of the rotating rotor 6, it is possible to ensure stable rotation without being adversely affected by variation in magnetization or the like.

Further, in the present embodiment, the magnetic path is formed such that the magnetic flux generated by energization of the coil 4 flows through the second magnetic pole part 1c of the stator 1A, the air gap between the second magnetic pole part 1c and the permanent magnet 7, the permanent magnet 7, and the core 9, and reaches the support section 1a. This makes it possible to cause the magnetic flux generated by coil excitation to effectively act on the permanent magnet 7, to thereby increase the motor output from the stepping motor 11A.

Further, in the present embodiment, since the magnet diameter of the permanent magnet 7 determines the maximum diameter of the stepping motor 11A, the dimension of the stepping motor 11A in the radial direction can be made smaller than a conventional motor mechanism which uses the substantially U-shaped yokes, insofar as the diameter of the permanent magnet 7 is the same. Note that the magnet diameter of the permanent magnet 7 is a main factor for securing torque, and it is basically considered that the torque is proportional to the square of the magnet diameter of the permanent magnet 7.

Note that the present invention is not limited to the arrangement of the above-described embodiments, but component elements can be changed in material, shape, dimension, form, number, location, etc. insofar as they do not depart from the spirit and scope of the present invention.

Figure 13:
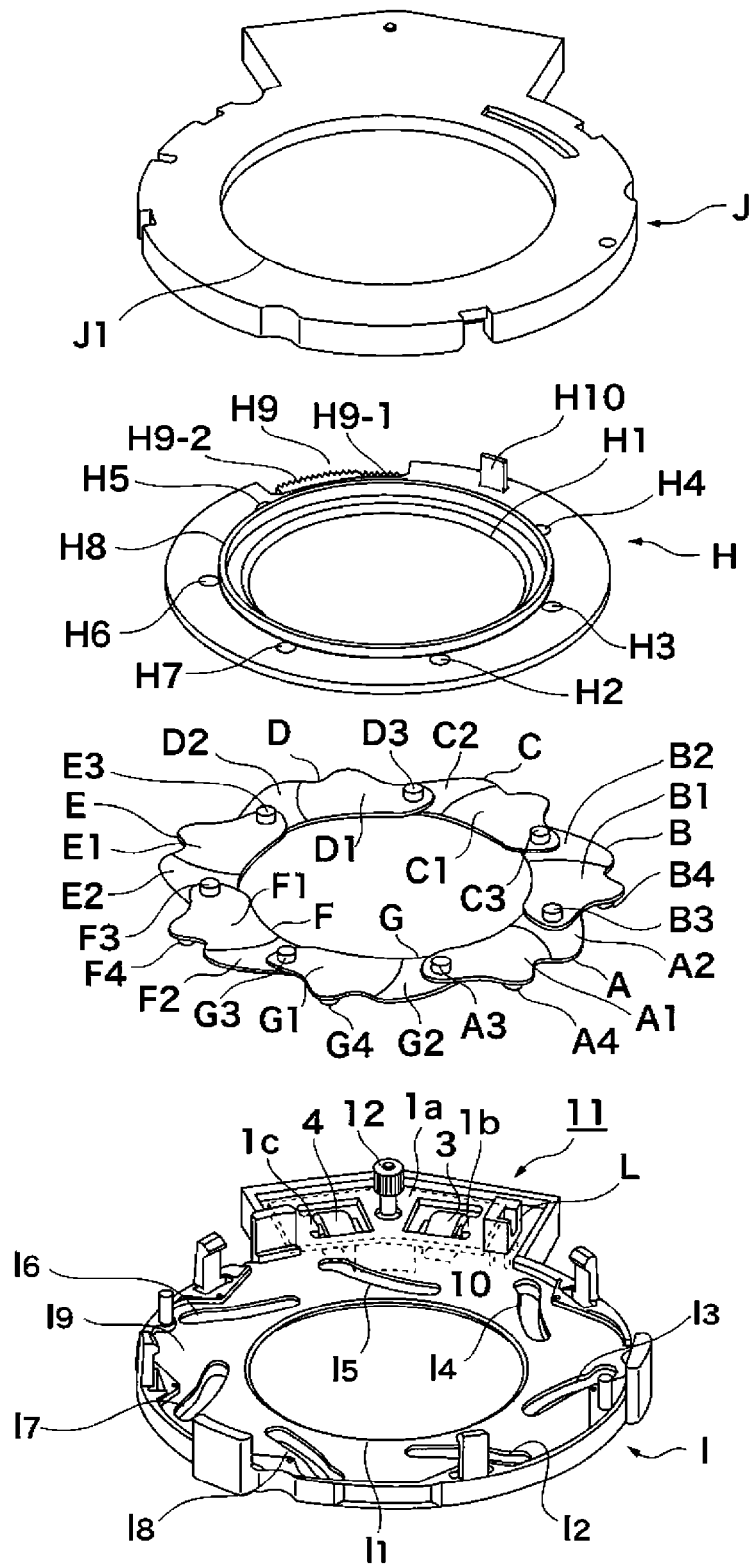
FIG. 13 is an exploded perspective view of a light amount adjustment device according to a third embodiment of the present invention.
Figure 14:
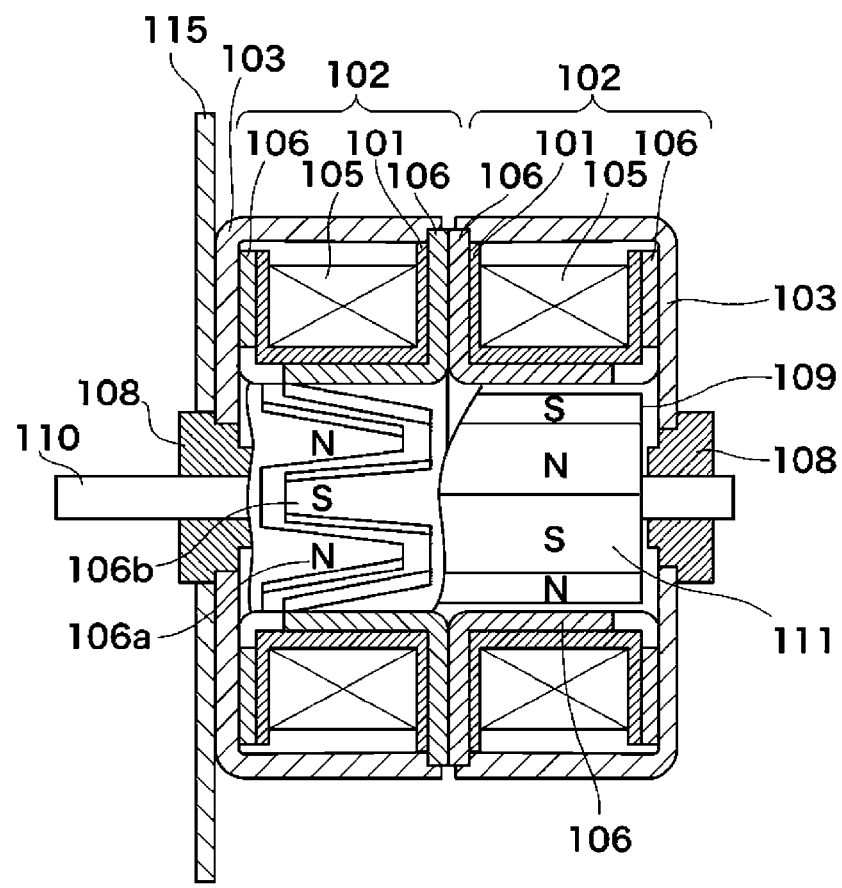
FIG. 14 is a vertical cross-sectional view schematically showing a conventional stepping motor.
Figure 15:
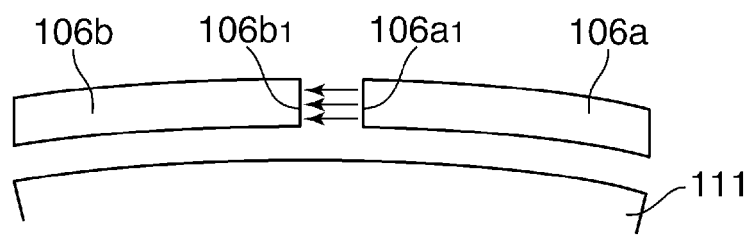
FIG. 15 is a partial cross-sectional view schematically showing a state of magnetic flux flowing from a stator of the stepping motor shown in FIG. 14.
Figure 16:
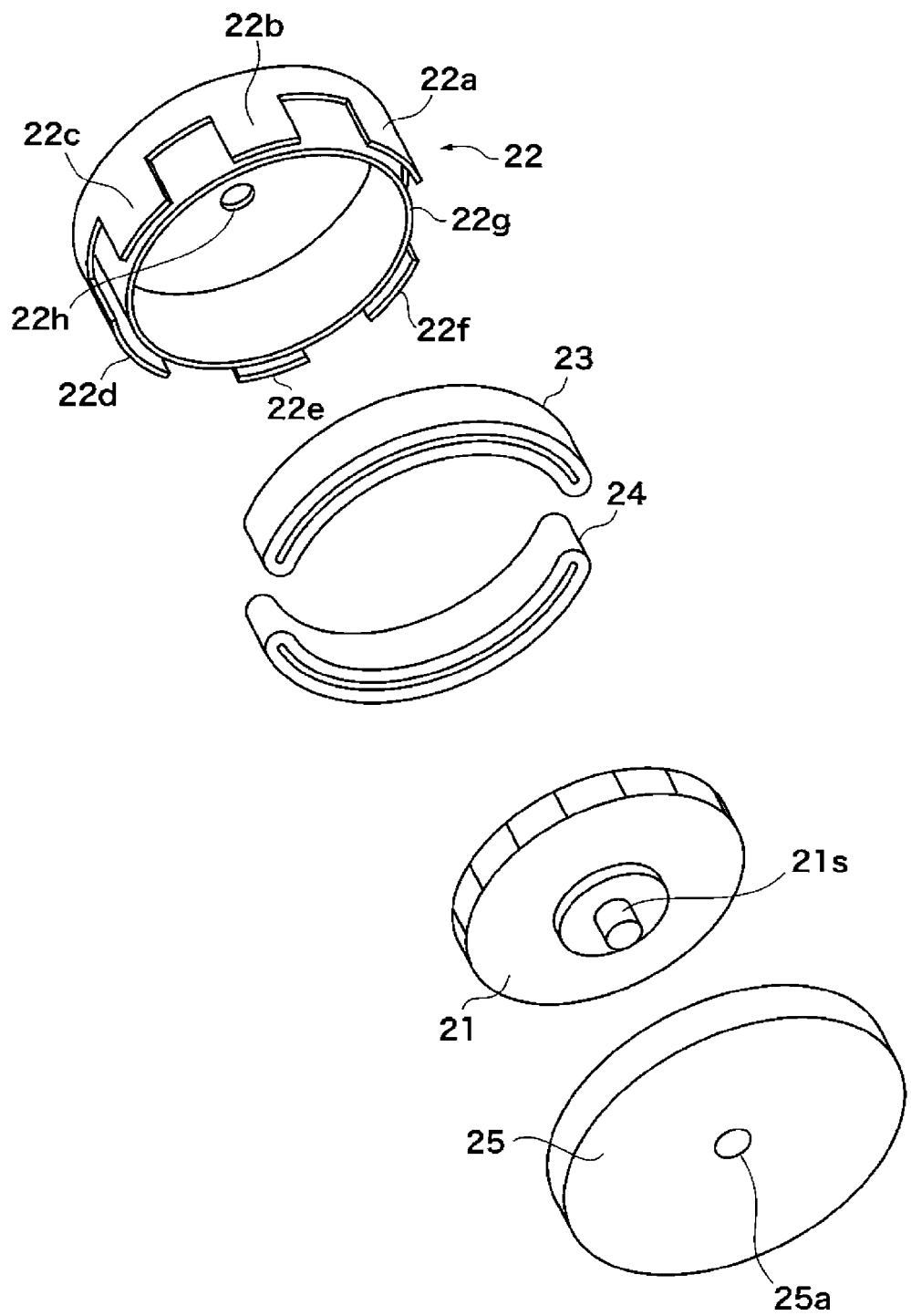
FIG. 16 is an exploded perspective view of another conventional stepping motor.
Figure 17:
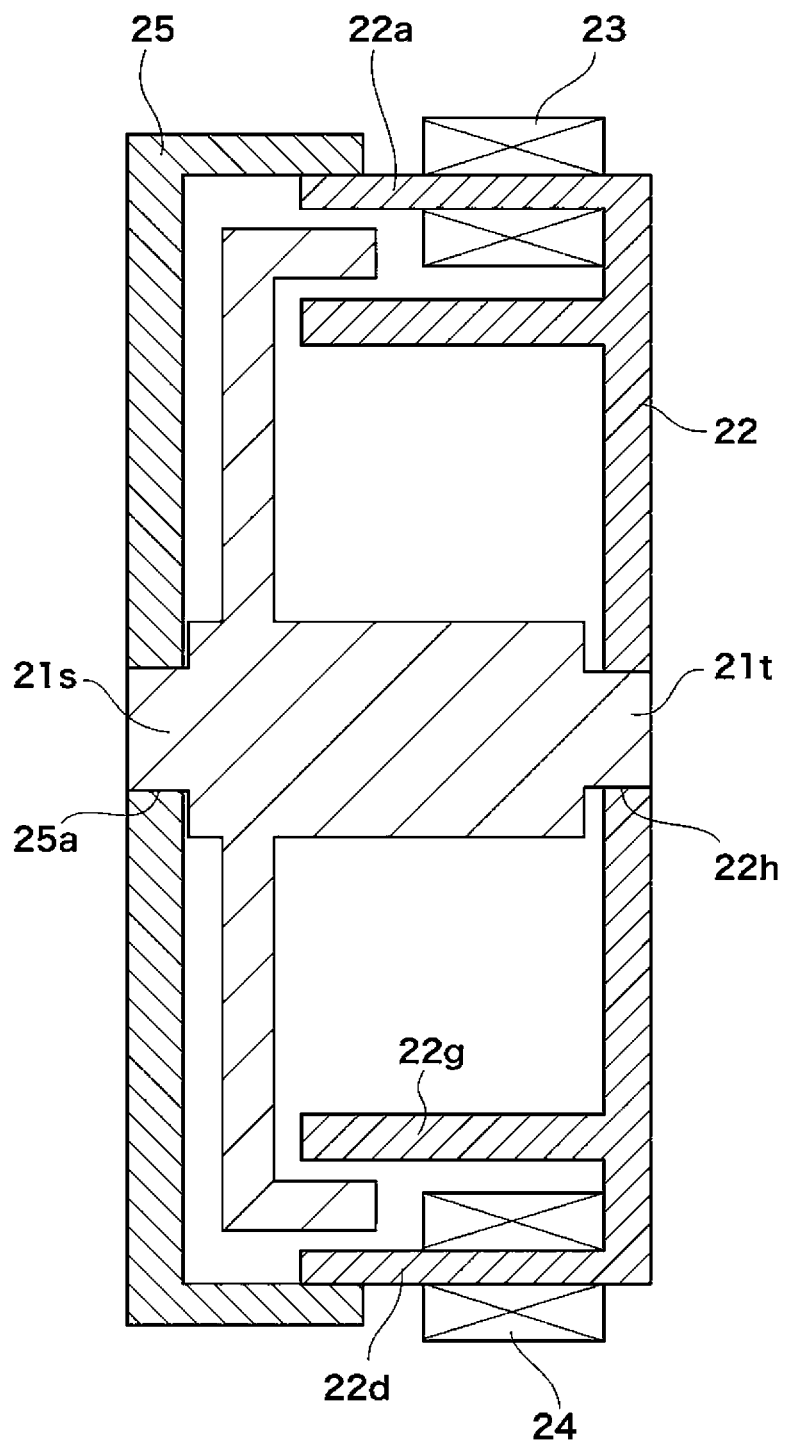
FIG. 17 is a cross-sectional view of the stepping motor shown in FIG. 16, which is in an assembled state, taken along an axial direction.
Figure 18:
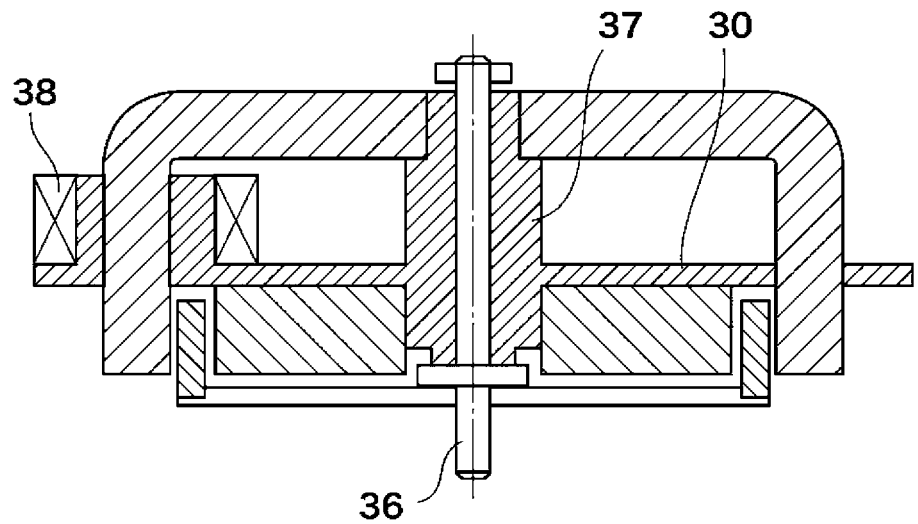
FIG. 18 is a cross-sectional view of still another stepping motor, taken along an axial direction.
Figure 19:
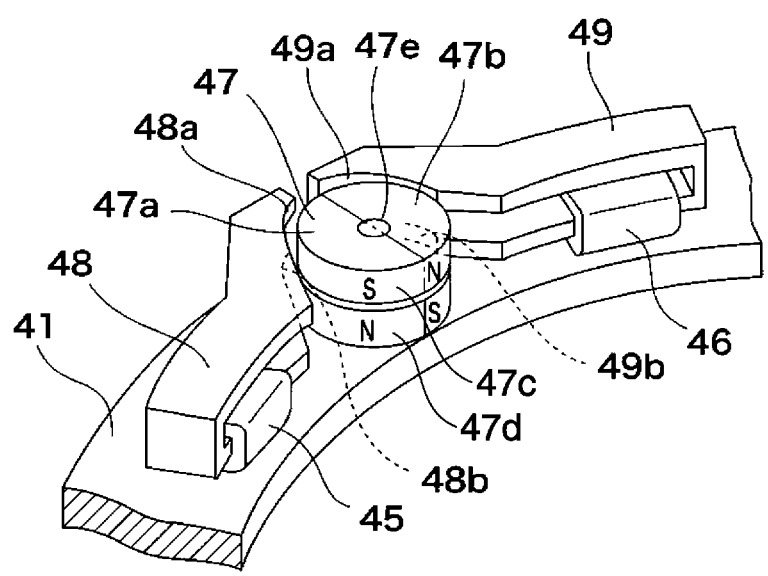
FIG. 19 is a perspective view of essential parts of still another conventional stepping motor.
Figure 20:
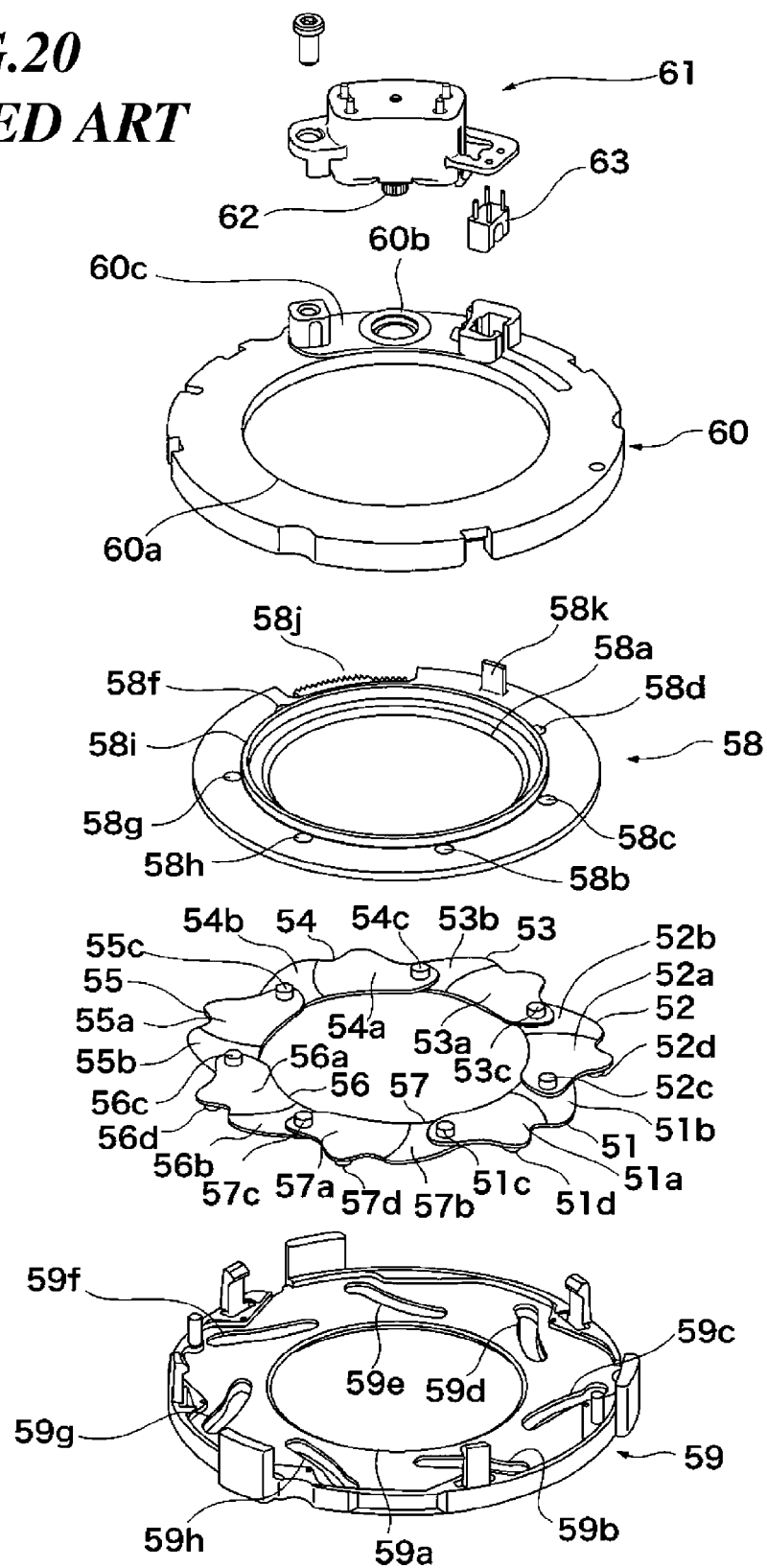
FIG. 20 is an exploded perspective view of a conventional light amount adjustment device.
Figure 21:
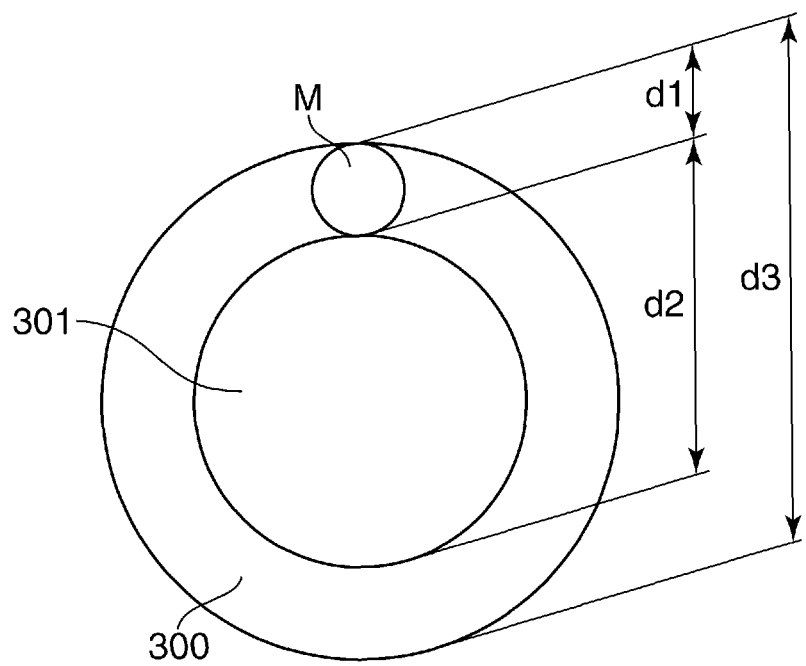
FIG. 21 is a view useful in explaining a relationship between the diameter of a motor and the diameter of a light amount adjustment device.

For example, although in the above-described first embodiment, the description has been given of the case where the stator 1 is formed on part of the holding member J, by way of example, in place of this, as shown in FIG. 13, the stator 1 may be formed on part of the base plate 19 of the cam member I and the motor mechanism 11 may be mounted thereon.

In this case, the base plate 19 is formed with the support section 1a, the first magnetic pole part 1b, the second magnetic pole part 1c, the opening I1, and the cam groove portions I2 to I8 all together by press working, which increases the opening accuracy of the aperture opening controlled by the plurality of aperture blades A to G.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-203148, No. 2010-203149, filed Sep. 10, 2010, which are hereby incorporated by reference herein in their entirety.

What is claimed is:

1. A light amount adjustment device, comprising:
a plurality of aperture blades configured to adjust an opening amount of an opening;
a drive member configured to drive said aperture blades;
a cam member configured to restrict an amount of movement of said aperture blades being driven by said drive member, into the opening;
a holding member that is fixed to said cam member in a manner sandwiching said drive member and said aperture blades therebetween; and
a motor mechanism that is gear-connected to said drive member and is configured to transmit a driving force to said drive member,
wherein said motor mechanism includes a rotor, a stator, a first magnetic pole part, a second magnetic pole part, a first coil and a second coil,
wherein said rotor is divided into a plurality of portions in a circumferential direction and alternately magnetized to different poles,
wherein said stator is made of a soft magnetic material and formed integrally with said holding member,
wherein said stator includes a support section, a first magnetic pole part and a second magnetic pole part,
wherein said support section configured to rotatably support a rotary shaft of said rotor,
wherein said first magnetic pole part is formed at a position different from a position of said support section in a direction to a rotational axis of said rotor, and extends toward an outer periphery of said rotor,
wherein said second magnetic pole part is formed at a position different from the position of said support section in a direction to the rotational axis of said rotor, and extends toward the outer periphery of said rotor,
wherein said first coil wound into a hollow-cylindrical shape, said first coil is inserted onto said first magnetic pole part from an extending end thereof, and
wherein said second coil wound into a hollow-cylindrical shape, said second coil is inserted onto said second magnetic pole part from an extending end thereof.

2. A light amount adjustment device, comprising:
a plurality of aperture blades configured to adjust an opening amount of an opening;
a drive member configured to drive said aperture blades;
a cam member configured to restrict an amount of movement of said aperture blades being driven by said drive member, into the opening;
a holding member that is fixed to said cam member in a manner sandwiching said drive member and said aperture blades therebetween; and
a motor mechanism that is gear-connected to said drive member and is configured to transmit a driving force to said drive member,
wherein said motor mechanism includes a rotor, a stator, a first coil and a second coil,
wherein said rotor is divided into a plurality of portions in a circumferential direction and alternately magnetized to different poles,
wherein said stator is made of a soft magnetic material and formed integrally with said cam member,
wherein said stator includes a support section, a first magnetic pole part and a second magnetic pole part,
wherein said support section configured to rotatably support a rotary shaft of said rotor,
wherein said first magnetic pole part is formed at a position different from a position of said support section in a direction to a rotational axis of said rotor, and extends toward an outer periphery of said rotor,
wherein said second magnetic pole part is formed at a position different from the position of said support section in a direction to the rotational axis of said rotor, and extends toward the outer periphery of said rotor,
wherein said first coil wound into a hollow-cylindrical shape, said first coil is inserted onto said first magnetic pole part from an extending end thereof, and
wherein said second coil wound into a hollow-cylindrical shape, said second coil is inserted onto said second magnetic pole part from an extending end thereof.

3. The light amount adjustment device according to claim 1, wherein said cam member has the opening and cam grooves for restricting the amount of movement of said aperture blades into the opening, integrally formed therein.

4. A motor, comprising: a rotor divided into a plurality of portions in a circumferential direction and alternately magnetized to different poles; a first coil wound into a hollow cylindrical shape; a second coil wound into a hollow cylindrical shape; and a stator made of a soft magnetic material, wherein said stator is formed integrally with a support section, a first magnetic pole part and a second magnetic pole part, wherein said support section configured to rotatably support a rotary shaft of said rotor, wherein said first magnetic pole part is formed at a position different from a position of said support section in a direction to a rotational axis of said rotor, and extends toward an outer periphery of said rotor, wherein said second magnetic pole part is formed at a position different from the position of said support section in a direction to the rotational axis of said rotor, and extends toward the outer periphery of said rotor, wherein said first coil wound into a hollow-cylindrical shape, said first coil is inserted onto said first magnetic pole part from an extending end thereof, and wherein said second coil wound into a hollow-cylindrical shape, said second coil is inserted onto said second magnetic pole part from an extending end thereof.

5. A light amount adjustment device, comprising: a plurality of aperture blades configured to adjust an opening amount of an opening; a drive member configured to drive said aperture blades; a cam member configured to restrict an amount of movement of said aperture blades being driven by said drive member, into the opening; a holding member that is fixed to said cam member in a manner sandwiching said drive member and said aperture blades therebetween; and a motor that is gear-connected to said drive member and is configured to transmit a driving force to said drive member, wherein said motor comprises: a rotor divided into a plurality of portions in a circumferential direction and alternately magnetized to different poles; a first coil wound into a hollow cylindrical shape; a second coil wound into a hollow cylindrical shape; and a stator made of a soft magnetic material, wherein said stator is formed integrally with a support section, a first magnetic pole part and a second magnetic pole part, wherein said support section configured to rotatably support a rotary shaft of said rotor, wherein said first magnetic pole part is formed at a position different from a position of said support section in a direction to a rotational axis of said rotor, and extends toward an outer periphery of said rotor, wherein said second magnetic pole part is formed at a position different from the position of said support section in a direction to the rotational axis of said rotor, and extends toward the outer periphery of said rotor, wherein said first coil wound into a hollow-cylindrical shape, said first coil is inserted onto said first magnetic pole part from an extending end thereof, and wherein said second coil wound into a hollow-cylindrical shape, said second coil is inserted onto said second magnetic pole part from an extending end thereof.

6. The light amount adjustment device according to claim 1,
wherein said first magnetic pole part and said second magnetic pole part are formed by being bent from said support section in the direction of the rotational axis of said rotor, and further being bent in a direction orthogonal to the rotational axis of said rotor.

7. The light amount adjustment device according to claim 2,
wherein said first magnetic pole part and said second magnetic pole part are formed by being bent from said support section in the direction of the rotational axis of said rotor, and further being bent in a direction orthogonal to the rotational axis of said rotor.

8. The light amount adjustment device according to claim 4,
wherein said first magnetic pole part and said second magnetic pole part are formed by being bent from said support section in the direction of the rotational axis of said rotor, and further being bent in a direction orthogonal to the rotational axis of said rotor.

9. The light amount adjustment device according to claim 5,
wherein said first magnetic pole part and said second magnetic pole part are formed by being bent from said support section in the direction of the rotational axis of said rotor, and further being bent in a direction orthogonal to the rotational axis of said rotor.

* * * * *